(12) United States Patent (10) Patent No.: US 7,451,846 B2
Wubbolts et al. (45) Date of Patent: Nov. 18, 2008

(54) SNOWMOBILE FRAME

(75) Inventors: Jerome Wubbolts, Orford (CA); Anne-Marie Dion, Granby (CA)

(73) Assignee: Bombardier Recreational Products Inc., Valcourt (CA)

( * ) Notice: Subject to any disclaimer, the term of this patent is extended or adjusted under 35 U.S.C. 154(b) by 367 days.

(21) Appl. No.: 11/330,064

(22) Filed: Jan. 12, 2006

(65) Prior Publication Data

US 2006/0108164 A1 May 25, 2006

Related U.S. Application Data

(60) Continuation of application No. 10/141,135, filed on May 9, 2002, now abandoned, which is a division of application No. 09/877,064, filed on Jun. 11, 2001, now Pat. No. 6,446,744, said application No. 10/141,135 is a continuation-in-part of application No. 09/472,133, filed on Dec. 23, 1999, now abandoned.

(60) Provisional application No. 60/246,110, filed on Nov. 7, 2000, provisional application No. 60/237,384, filed on Oct. 4, 2000.

(30) Foreign Application Priority Data

Dec. 23, 1989 (CA) ..................................... 2256944

(51) Int. Cl.
*B62M 27/02* (2006.01)
(52) U.S. Cl. ........................ 180/183; 180/182; 180/184; 180/186; 180/190
(58) Field of Classification Search ................. 180/183, 180/184, 182, 186, 190
See application file for complete search history.

(56) References Cited

U.S. PATENT DOCUMENTS 3,578,095 A 5/1971 Hauser (Continued)

FOREIGN PATENT DOCUMENTS

CA 2251769 8/1995

OTHER PUBLICATIONS

Magazine Article: Dirt Wheels/Jan. 1991.

(Continued)

*Primary Examiner*—Joanne Silbermann
*Assistant Examiner*—Michael R Stabley
(74) *Attorney, Agent, or Firm*—Osler, Hoskin & Harcourt LLP

(57) ABSTRACT

A snowmobile frame includes a tunnel, the tunnel includes a left structure having a front portion and a rear portion, a right side structure having a front portion and a rear portion, a radiator interconnecting the rear portion and the left side structure with the rear portion of the right side structure, and an engine cradle forward of the tunnel. The engine cradle includes a front wall connecting the front portion of the left side structure and the front portion of the right side structure, a rear wall interconnecting the left side structure and the right side structure, and a bottom plate intermediate the front wall and the rear wall and interconnecting the left side structure with the right side structure. A snowmobile including the snowmobile frame includes an engine and a fastener passing through a hole in one of the left side structure and the right side structure to fasten the engine thereto.

4 Claims, 37 Drawing Sheets

U.S. PATENT DOCUMENTS

| | | | |
|---|---|---|---|
| 3,583,506 A | 6/1971 | Preble | |
| 3,583,507 A | 6/1971 | Trautwein | |
| 3,622,196 A | 11/1971 | Sarra | |
| 3,627,073 A | 12/1971 | Grimm | |
| 3,698,497 A | 10/1972 | Bombardier | |
| 3,870,115 A | 3/1975 | Hase | |
| 3,871,460 A * | 3/1975 | Dehnert | 180/190 |
| 3,981,373 A * | 9/1976 | Irvine | 180/190 |
| 4,008,777 A | 2/1977 | Juto et al. | |
| 4,184,697 A | 1/1980 | Suzuki et al. | |
| 4,204,581 A | 5/1980 | Husted | |
| 4,204,582 A | 5/1980 | Van Soest | |
| 4,337,958 A * | 7/1982 | Witt et al. | 280/16 |
| 4,502,560 A * | 3/1985 | Hisatomi | 180/190 |
| 4,593,921 A * | 6/1986 | Marier | 280/21.1 |
| 4,613,006 A | 9/1986 | Moss et al. | |
| 4,620,604 A * | 11/1986 | Talbot | 180/190 |
| 4,633,964 A * | 1/1987 | Boyer et al. | 180/190 |
| 4,699,229 A * | 10/1987 | Hirose et al. | 180/9.21 |
| 4,848,503 A * | 7/1989 | Yasui et al. | 180/190 |
| 5,172,786 A * | 12/1992 | Ishibashi et al. | 180/190 |
| 5,279,381 A * | 1/1994 | Fukuda | 180/190 |
| 5,370,198 A * | 12/1994 | Karpik | 180/193 |
| 5,372,215 A * | 12/1994 | Fukuda | 180/190 |
| 5,474,146 A | 12/1995 | Yoshioka et al. | |
| 5,564,517 A | 10/1996 | Levasseur | |
| 5,570,753 A | 11/1996 | Carlini | |
| 5,641,180 A | 6/1997 | Kamei et al. | |
| 5,660,245 A * | 8/1997 | Marier et al. | 180/190 |
| 5,743,590 A | 4/1998 | Baumann | |
| 5,857,538 A | 1/1999 | Chambers | |
| 5,944,133 A * | 8/1999 | Eto | 180/190 |
| 5,975,624 A * | 11/1999 | Rasidescu et al. | 296/203.01 |
| 6,234,263 B1 | 5/2001 | Boivin et al. | |

OTHER PUBLICATIONS

Brochure of Yamaha Snow Scout: Motoneige Quebec, 1987, vol. 13, No. 1 (CA).
Brochure of Yamaha Snow Scout: Snowmobile Brochure Business, 3rd Annual.
Magazine Supertrax/Jan. 1999.
Snow tech, Spring 1999, Article "Special Report" Redline Snowmobiles, pp. 28-31.
Montoneige Quebec, vol. 25—No. 3, Nov. 1999, pp. 1 (front cover), 6, 31 and 58.
Creations J.P.L. Inc. Advertisement (advertising seat designs).

* cited by examiner

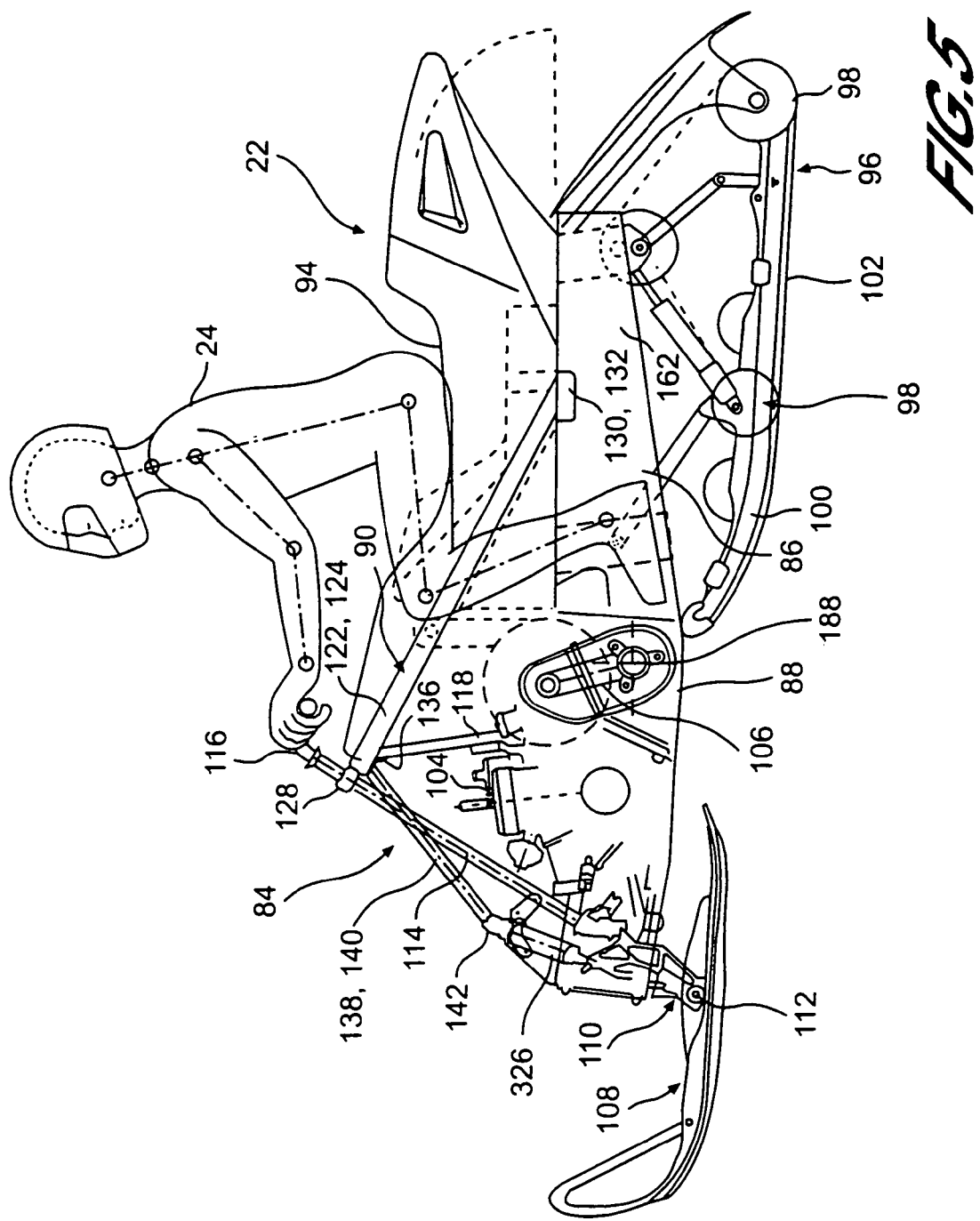

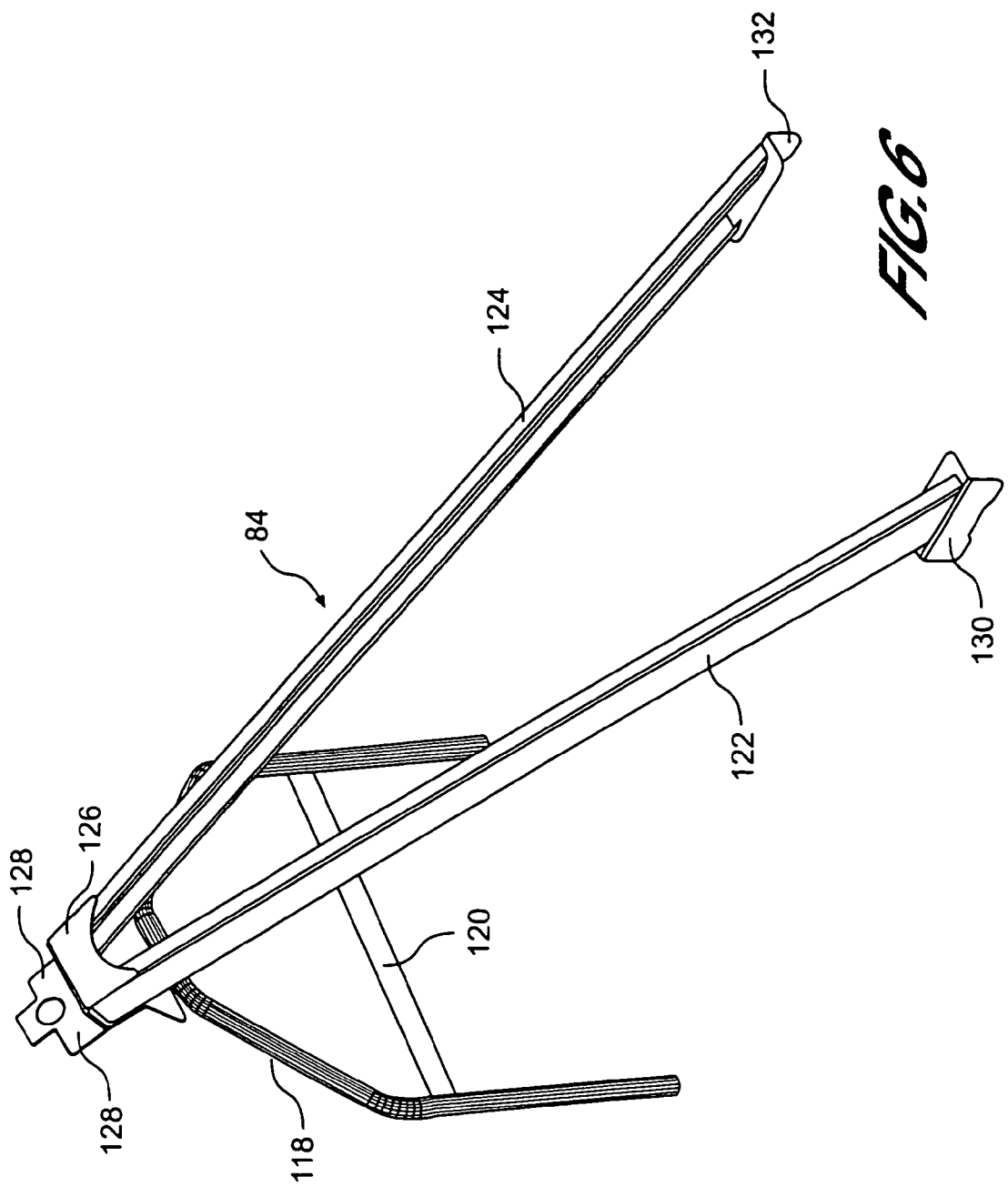

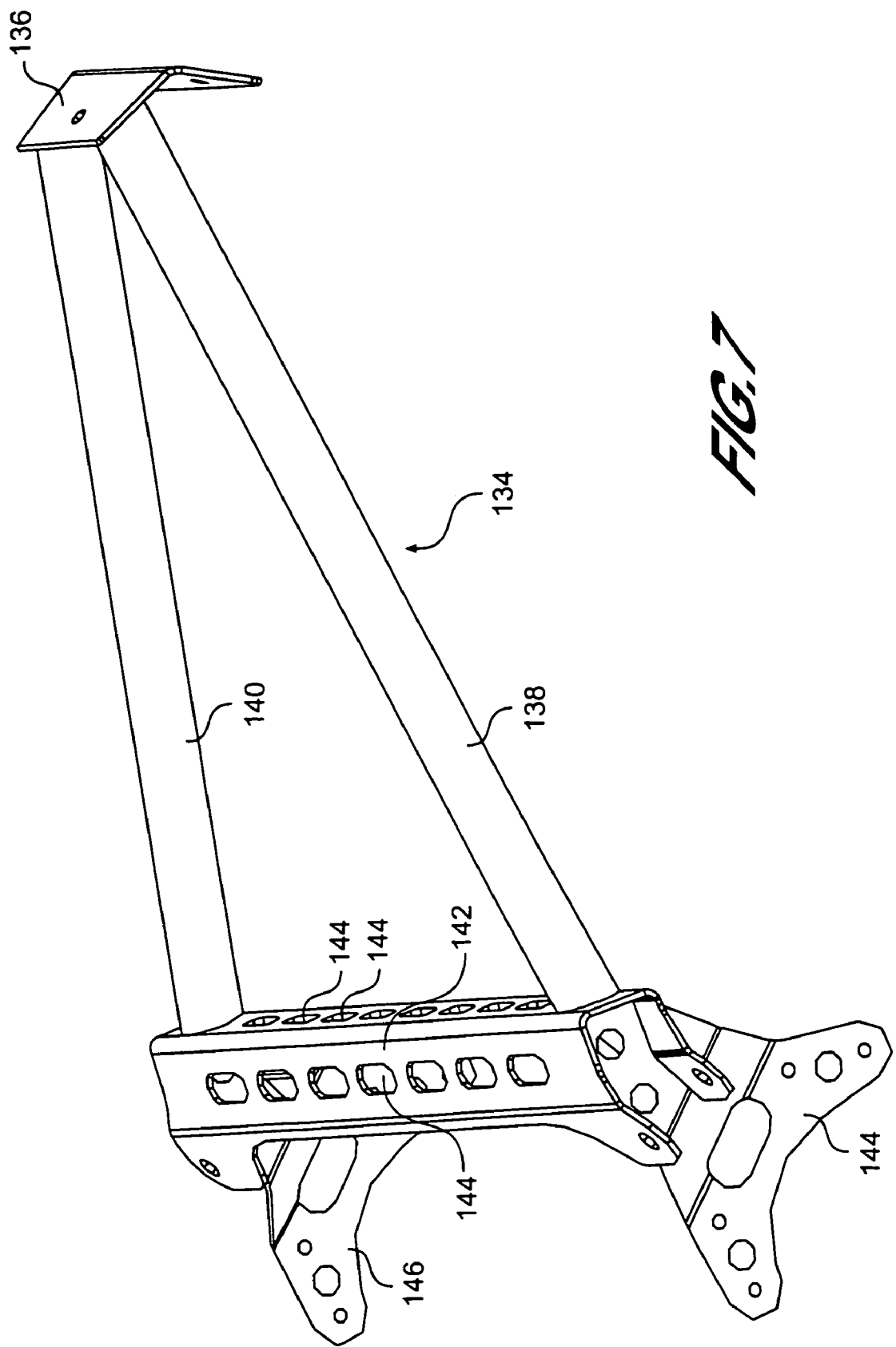

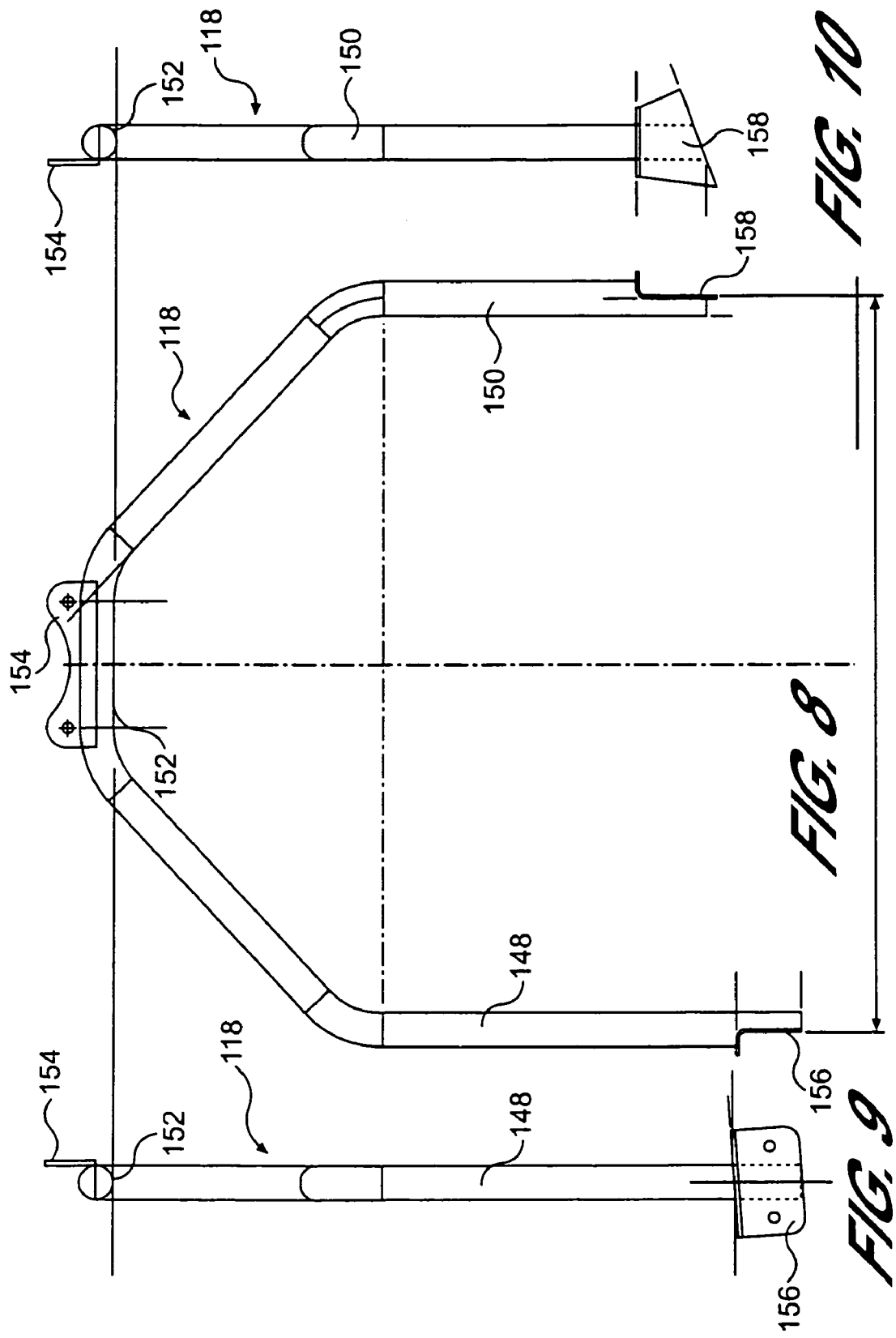

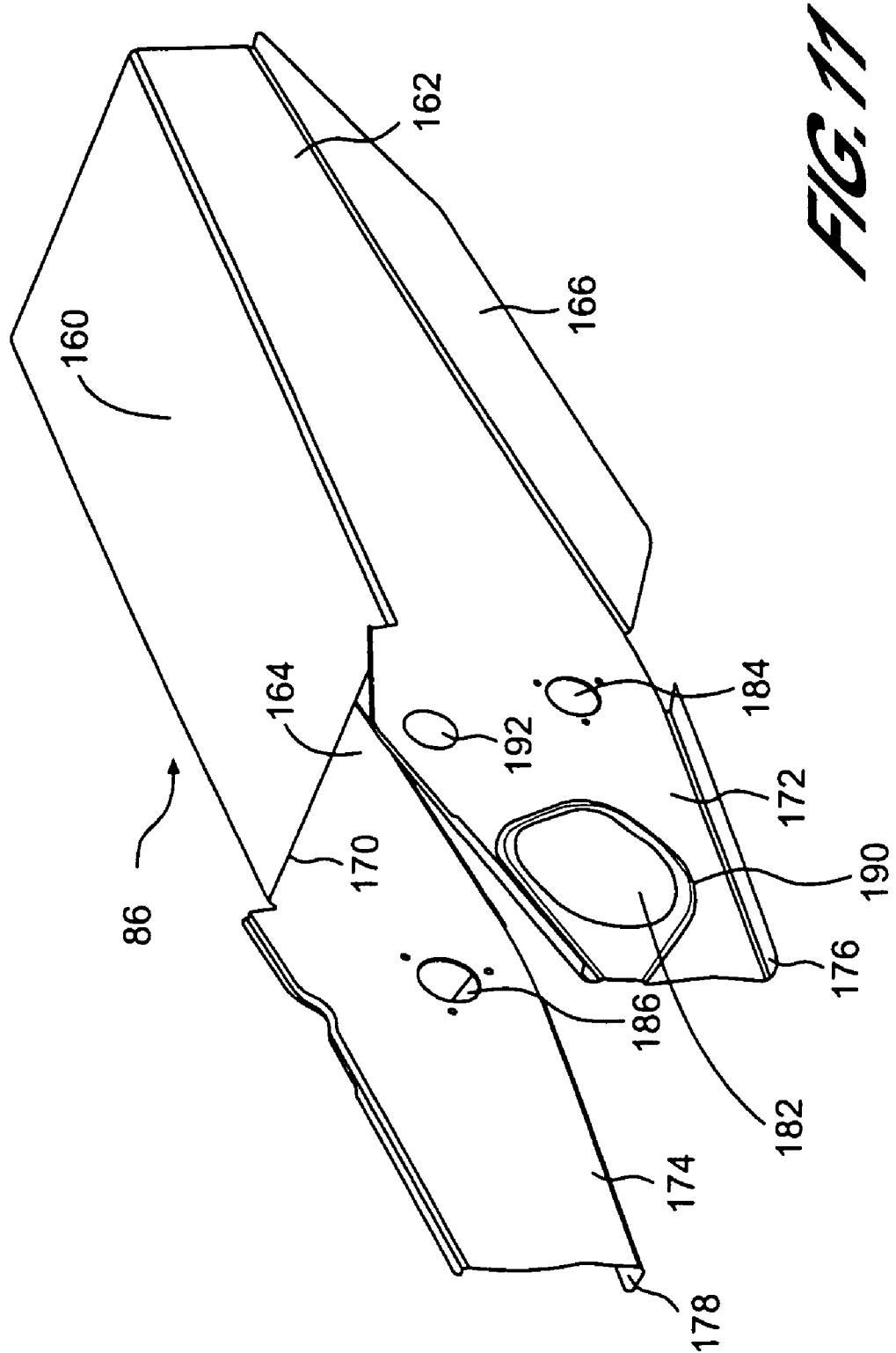

SNOWMOBILE FRAME

CROSS REFERENCE TO RELATED APPLICATIONS

This is a continuation of U.S. application Ser. No. 10/141,135 (the "'135 application"), filed May 9, 2002, which is a divisional of U.S. application Ser. No. 09/877,064 (the "'064 application"), filed Jun. 11, 2001, which claims priority to U.S. application 60/246,110, filed Nov. 7, 2000, the entire contents of all of which are incorporated herein by reference. The '135 application is a continuation-in-part of U.S. application Ser. No. 09/472,133, filed Dec. 23, 1999, the contents of which are incorporated herein by reference, which claims priority to Canadian Patent Application 2,256,944, filed Dec. 23, 1998, the contents of which are also incorporated herein by reference. This application also incorporates by reference U.S. application Ser. No. 09/472,134, filed Dec. 23, 1999. In addition, this application incorporates by reference U.S. Application No.60/230,432, filed Sep. 6, 2000. Finally, through the '064 application, this application claims priority to U.S. Application 60/237,384, filed Oct. 4, 2000, the contents of which are incorporated herein by reference.

BACKGROUND OF THE INVENTION

1. Field of the Invention

The present invention concerns generally concerns the construction of vehicles such as snowmobiles, all terrain vehicles ("ATVs"), and other similar vehicles. More specifically, the present invention concerns the construction of a frame for such vehicles.

2. Description of the Related Art

Snowmobiles, ATVs, and related vehicles (hereinafter, "recreational vehicles," although the appellation should not be construed to be limited only to the vehicles or type of vehicles described herein) often function under similar operating conditions. Despite this, snowmobiles, ATVs, and other recreational vehicles do not share a common design approach or a commonality of components. This is due, in large part, to the different stresses and strains (mainly at the extremes) that the different vehicles experience during routine operation.

As a general rule, the prior art includes few, if any, examples of a common design approach to ATVs and snowmobiles. Primarily, this appears to be due to the fact that these vehicles were designed traditionally from two radically different starting points.

Snowmobile frames traditionally have been constructed with a tunnel and an engine cradle, which are individual elements made from metal, plate-like elements, as shown in FIG. 4. ATV frames, on the other hand, have been constructed in much the same way as motorcycle frames by connecting a number of tubular frame elements to one another.

In the case of snowmobiles, the tunnel and engine cradle combination (referred to herein as the "frame" or "frame assembly") traditionally has been made of a very strong but light-weight material such as aluminum. To withstand the forces encountered under normal operating conditions, the individual plate elements of the tunnel and engine cradle have been relatively thick so that they do not bend or buckle under high loads. Unfortunately, this adds significantly to the overall weight of the vehicle.

Moreover, several holes need to be provided at various locations in the engine cradle to accommodate shafts for the drive axle, the transmission, and the gearbox. Traditionally, the holes have been drilled into the engine cradle after its construction. A problem with this construction technique is that the holes may not line up as precisely as the manufacturer would like. In some cases, the manufacturer must expend considerable resources to align these shaft holes before producing the final vehicle product.

SUMMARY OF THE INVENTION

In view of the foregoing, one object of the present invention is to exploit the design elements of a snowmobile that are easily and readily transferred to the design of an ATV based on the same basic frame structure.

To that end, one object of the present invention is to provide an engine cradle adapted for receiving an engine that includes a left side wall defining a C-shaped opening therein. The engine cradle also includes a right side wall that is essentially solid and that provides a reflective surface for reflecting heat to the engine when contained within the engine cradle. As would be known by one skilled in the art, the right side wall could define the C-shaped opening and the left side wall could define the wall that is essentially solid. The engine cradle also includes a front wall that is connected between forward portions of the left and right side walls. Finally, the engine cradle has a bottom panel and apron connected between bottom portions of the front, left side, and right side walls.

It is another object of the present invention to provide front, left side, and right side walls that are stamped from a sheet of metal. The holes in the walls are stamped into the metal in the same plane that the walls are stamped from the metal sheet. This assured that the holes align with one another during manufacture of the frame assembly.

One further object of the present invention is to provide an engine cradle where the walls have a thickness of less than about 2.5 mm and, more preferably, about 2.0 mm.

Still another object of the present invention is to provide a vehicle frame with a left side structure and a right side structure. A radiator connects the left side structure and the right side structures to one another at a rear portion. A front wall connects between front portions of the left and right side structures. An engine cradle bottom plate and apron connects to the front wall and forward portions of the left and right side structures to define a cradle adapted to receive an engine. The left side structure, the right side structure, the front wall, and the engine cradle bottom plate are each stamped from a sheet of metal.

It is a further object of the present invention to provide a foot-gripping element on a footrest that includes a jagged portion extending upwardly from the footrest and defining teeth at a top portion thereof. A deflector portion is positioned at an opposite side of a hole through the footrest and is angled downwardly from the footrest to discourage particles from being stirred up and passing through the hole onto a top portion of the footrest.

It is still another object of the present invention to incorporate a heat exchanger into the tunnel. In an alternate embodiment, the heat exchanger is a radiator that extends substantially the length of the tunnel and assists in dissipating heat from engine coolant circulating therethrough.

Still other objects of the present invention will be made apparent by the discussion that follows.

BRIEF DESCRIPTION OF THE DRAWINGS

The invention will be more fully described in conjunction with the following drawings, in which like reference characters denote like features, wherein:

FIG. 5 is a side view schematic illustration of the snowmobile illustrated in FIG. 2, with the fairings and external details removed to show some of the internal components of the snowmobile and their positional relationship to one another;

FIG. 6 is a perspective illustration of a portion of the frame assembly of the present invention, specifically the portion disposed toward the rear of the vehicle;

FIG. 7 is a perspective illustration of a forward support frame, which connects with the portion of the frame assembly depicted in FIG. 6;

FIG. 8 is a front view illustration of an upper column of the frame assembly shown in FIG. 6;

FIG. 9 is a left side view illustration of the upper column depicted in FIG. 8;

FIG. 10 is a right side view illustration of the upper column shown in FIG. 8;

FIG. 11 is a perspective illustration, from the front left side, of a tunnel portion of the frame assembly of the present invention;

FIG. 36(a) is an enlarged version of the radiator of FIG. 36 schematically illustrating the connection of the radiator to the left and right side structures;

DETAILED DESCRIPTION

Before delving into the specific details of the present invention, it should be noted that the conventions "left," "right,"

"front," "forward", "upward", "downward" and "rear" are defined according to the normal, forward travel direction of the vehicle being discussed. As a result, the "left" side of a snowmobile is the same as the left side of the rider seated in a forward-facing position on the vehicle (or travelling in a forward direction on the vehicle).

Figure 1:
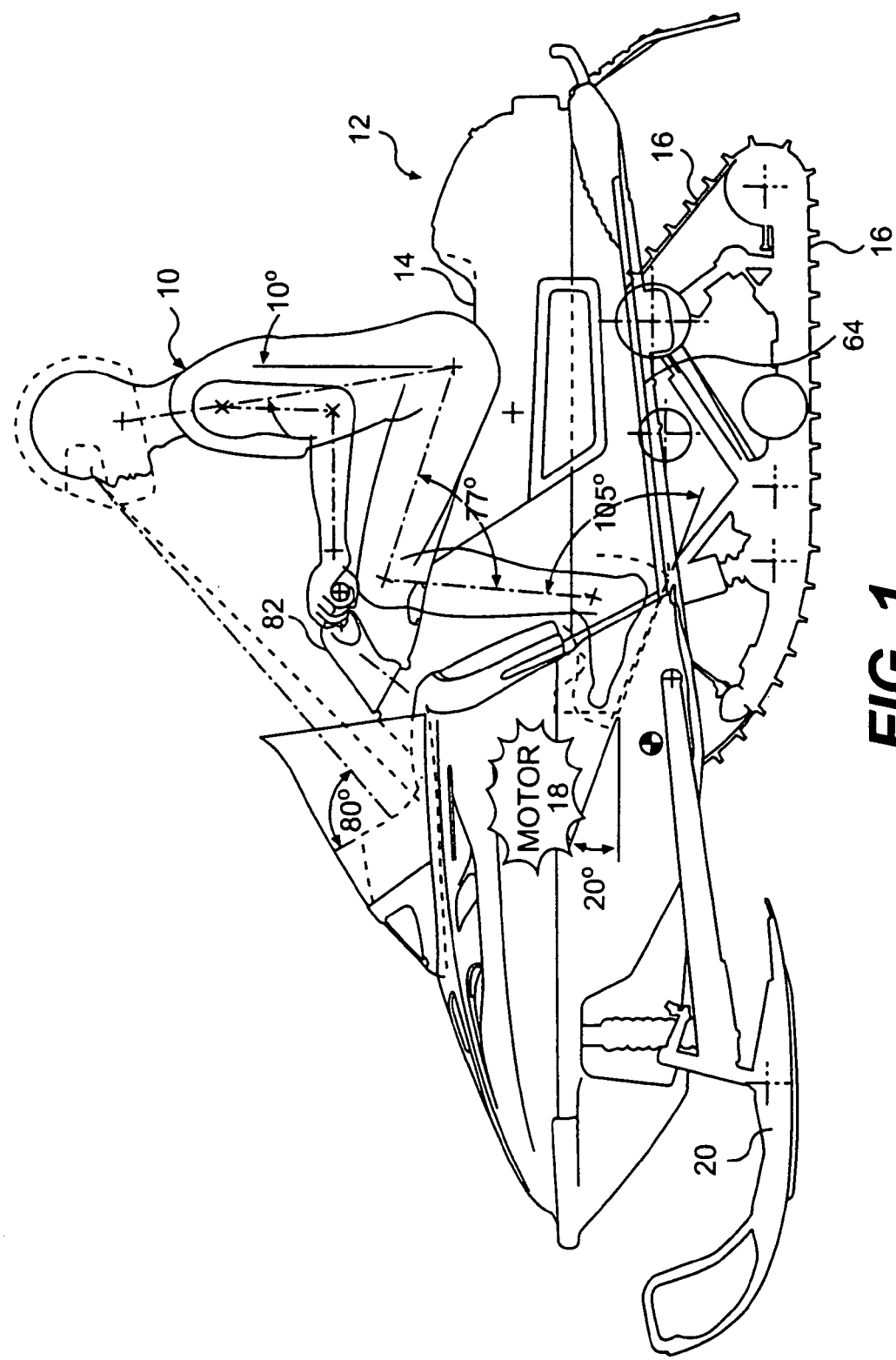
FIG. 1 is a side-view schematic illustration of a prior art snowmobile, showing the prior art positioning of a rider thereon.

FIG. 1 illustrates a rider operator 10 sitting on a prior art snowmobile 12. Rider 10 is positioned on seat 14, with his weight distributed over endless track 16. Motor 18 (shown in general detail) is located over skis 20. As with any snowmobile, endless track 16 is operatively connected to motor (or engine) 18 to propel snowmobile 12 over the snow. Motor or engine 18 typically is a two-stroke internal combustion engine. Alternatively, a 4-stroke internal combustion engine may be substituted therefor. In addition, any suitable engine may be substituted therefor.

Figure 2:
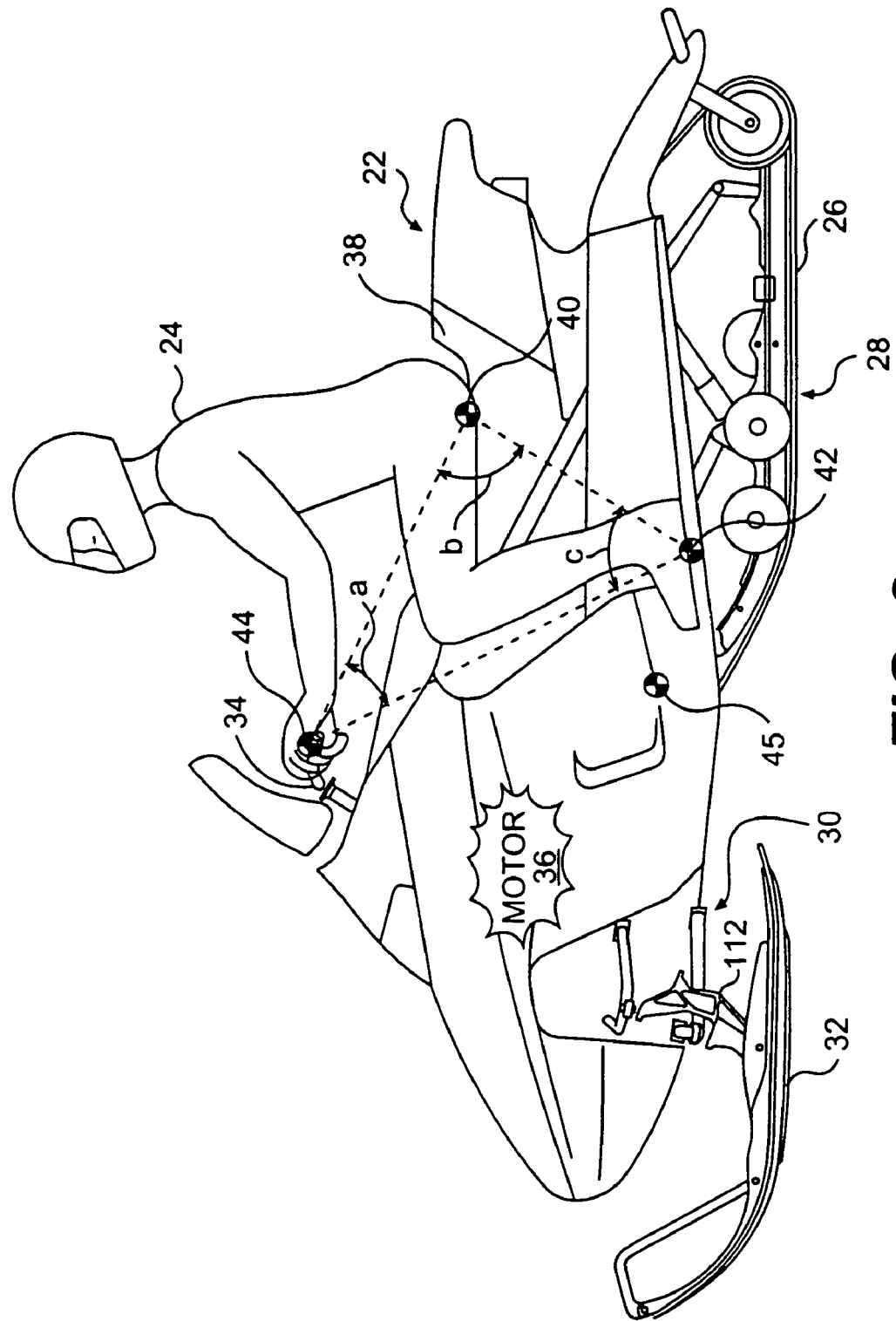
FIG. 2 is a side view illustration of the exterior of a snowmobile constructed according to the teachings of the present invention, also showing the positioning of a rider thereon.

FIG. 2 provides a side view of a snowmobile 22 constructed according to the teachings of the present invention. Here, rider/operator 24 is shown in a more forward, racing-like position, which is one of the aspects of the present invention. In this position, the weight of operator 24 is forward of the position of rider 10 in the prior art example.

The positioning of rider 24 closer to motor 36 offers several advantages that are not achieved by the prior art. For example, since rider 24 is positioned closer to the engine 36, the center of gravity of rider 24 is closer to the center of gravity of the vehicle, which is often at the drive axle of the vehicle or near thereto. In other words, rider 24 has his weight distributed more evenly over the center of gravity of the vehicle. As a result, when the vehicle traverses rough terrain, rider 24 is better positioned so that he does not experience the same impact from an obstacle as rider 10 on snowmobile 12. The improved rider positioning illustrated in FIG. 2 also improves the rider's ability to handle the vehicle.

FIG. 2 illustrates the basic elements of snowmobile 22. Snowmobile 22 includes an endless track 26 at its rear for propulsion. A rear suspension 28 connects endless track 26 to the vehicle frame. Snowmobile 22 also includes a front suspension 30. Skis 32, which are operatively connected to handlebars 34, are suspended from the front suspension 30 for steering the vehicle. A motor or engine (preferably, an internal combustion engine) 36 is located at the front of snowmobile 22, above skis 32. Operator 24 is seated on a seat 38, which is positioned above the endless track 26.

Three positional points of particular relevance to the present invention are also shown in FIG. 2. Specifically, seat position 40, foot position 42, and hand position 44 of operator 24 are shown. In the modified seating position of operator 24, which is made possible by the teachings of the present invention, hand position 44 is forward of foot position 42, which is forward of seat position 40. The three positions define three angles, a, b, and c between them that help to define the seating position of operator 24, which permits rider 24 to be closer to the center of gravity 45 of the vehicle. Moreover, hand position 44 is forward of center of gravity 45 of snowmobile 22.

Figure 3:
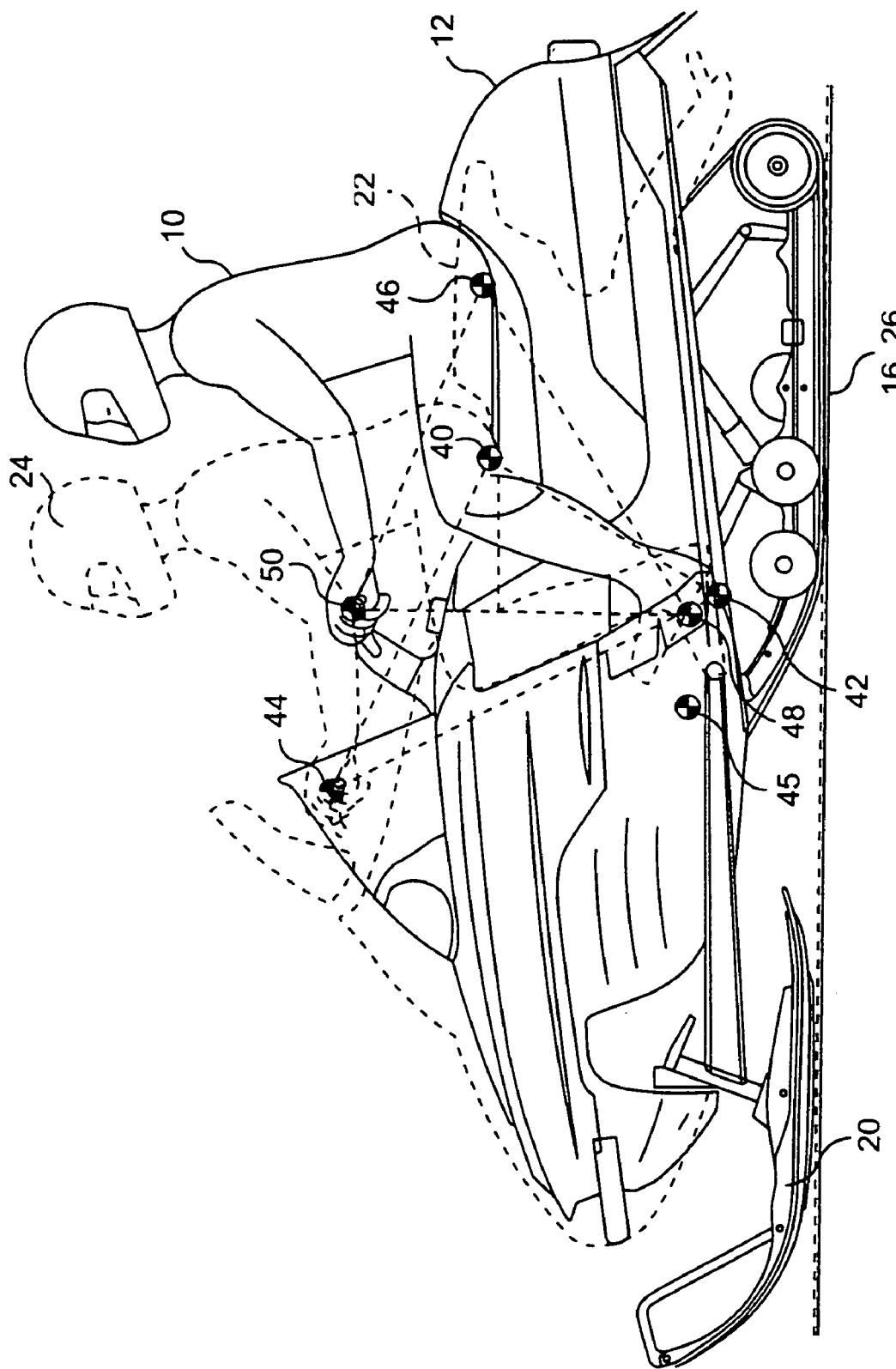
FIG. 3 is an overlay comparison between the a prior art snowmobile (of the type depicted in FIG. 1) and a snowmobile constructed according to the teachings of the present invention (as shown in FIG. 2), illustrating the difference in passenger positioning, among other features.

FIG. 3 provides an overlay between prior art snowmobile 12 and snowmobile 22 constructed according to the teachings of the present invention. Rider 10 (of prior art snowmobile 12) is shown in solid lines while operator 24 (of snowmobile 22) is shown in dotted lines for comparison. The comparative body positions of rider 10 and operator 24 are shown. As is apparent, the present invention permits the construction of a snowmobile 22 where the rider 24 is in a more forward position. Moreover seat position 40, foot position 42, and hand position 44 differ considerably from seat position 46, foot position 48, and hand position 50 in the prior art snowmobile 12. In this position, the center of gravity of operator 24 is closer to center of gravity 45 of snowmobile 22 than in the prior art example.

Figure 4:
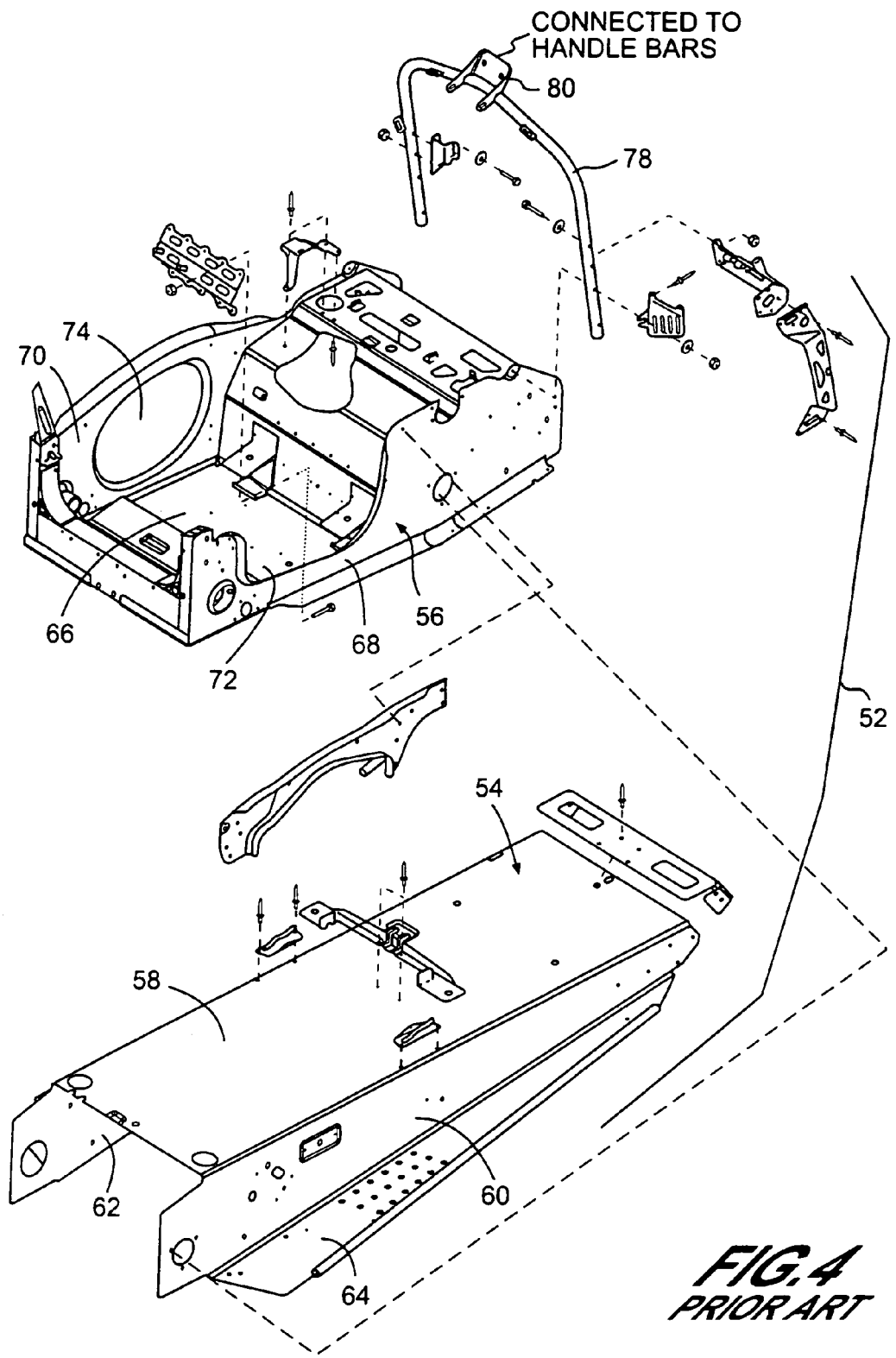
FIG. 4 is an exploded view of a frame assembly representative of the type of construction typical of a snowmobile assembled according to the teachings of the prior art (specifically, the view illustrates the components of a 2000 model year Ski-Doo® Mach™ Z made by Bombardier Inc. of Montreal, Québec, Canada)

As a basis for comparison with the figures that provide the details of the present invention, FIG. 4 provides an exploded view of a frame assembly 52 for a snowmobile constructed according to the teachings of the prior art. Frame assembly 52 includes, as its major components, a tunnel 54 and an engine cradle 56. As illustrated, engine cradle 56 is positioned in front of tunnel 54. Engine cradle 56 receives motor 18.

As shown in FIG. 4, tunnel 54 is basically an inverted U-shaped structure with a top plate 58 integrally formed with left and right side plates 60, 62, respectively. Top plate 58 provides the surface onto with seat 14 is mounted, as would be known to those skilled in the art. Foot boards 64 (of which only the left foot board is visible in FIG. 4) are integrally formed with the side plates 60, 62 and extend outwardly, perpendicular to the plane of side plates 60, 62. Foot boards 64 provide a location on which rider 10 may place his feet during operation of snowmobile 12. While top plate 58, side plates 60, 62, and foot boards 64 are preferably formed from aluminum, any suitable alternative material may be used, as would be recognized by those skilled in the art. Moreover, while top plate 58, side plates 60, 62 and foot boards 64 are shown as an integral structure, an integral construction is not required. Instead, top plate 58, side plates 60, 62, and foot boards 64 may be separately manufactured and connected to one another by any suitable means known in the art.

FIG. 4 also shows that engine cradle 56 is connected to tunnel 54 by any suitable means known to those skilled in the art. For example, engine cradle 56 may be welded or bolted to tunnel 54. Engine cradle includes a bottom plate 66 and left and right side walls 68, 70, which are provided with left and right openings 72, 74, respectively. Left opening 72 is provided so that the shafts for the transmission (typically a continuously variable transmission or CVT) may extend outwardly from left wall 68. The shafts that connect the engine 18 to the transmission pass through left opening 72. A gearbox (not shown) typically is provided on the right side of snowmobile 10. Left and right openings 72, 74 also allow heat from engine 18 to be radiated from engine cradle 56, which assists in cooling engine 18.

As FIG. 4 illustrates, left side wall 68 is provided with a beam 76 that is removably connected thereto. Beam 76 may be removed during servicing, for example, to facilitate access to the engine components and peripheral elements disposed within left opening 72.

FIG. 4 also illustrates the placement of a handlebar support element 78, which connects to the rear of engine cradle 56. Handlebar support element 78 is generally an inverted U-shaped structure that extends upwardly from the combined engine cradle 56 and tunnel 54. A bracket 80 is positioned at the midpoint of handlebar support element 78 and provides structural support for handlebars 82, which is used to steer snowmobile 12.

To provide an improved driver positioning, as described above, the inventors of the present invention appreciated the advantages of moving handlebars 82 forward of the position shown in FIG. 1. To do this, however, required a novel approach to the construction of frame assembly 52 of snowmobile 12. The redesign resulted in the present invention, which is described in detail below.

As illustrated in FIG. 5, snowmobile 22 incorporates a completely redesigned frame assembly 84. Frame assembly 84 includes, among other elements, tunnel 86, engine cradle 88, and over-arching frame elements 90. As with snowmobile 12, snowmobile 22 includes a seat 94 on which rider 24 sits while operating snowmobile 22. Tunnel 86 is connected to a rear suspension 96 that contains a number of wheels 98 disposed on a slide frame 100 around which an endless track 102 rotates to propel snowmobile 22 across the snow.

Endless track 102 is connected to engine 104 (preferably a two or four stroke internal combustion engine) positioned within engine cradle 88. Endless track 102 is connected to engine 104 through a transmission 106, which is preferably a continuously variable transmission (or "CVT"), as is known in the art.

Two skis 108 are provided at the front of snowmobile 22 for steering. Skis 108 are connected to engine cradle 88 through a front suspension 110. Front suspension 110 connects to skis 108 through a pivot joint 112 on the top of skis 108. Skis 108 are operatively connected to a steering shaft 114 that extends over engine 104. Steering shaft 114 is connected, in turn, to handlebars 116, which are used by operator 24 to steer snowmobile 22.

FIG. 6 illustrates the individual elements of rear frame assembly 84 in greater detail. Rear frame assembly 84 includes an upper column 118, which is an inverted U-shaped structural element. The upper column 118 is reinforced with a cross-member 120. A left brace 122 and a right brace 124 are connected to a bracket 126 above upper column 118. A bushing or bearing (or other similar element) 128 is attached to bracket 126 and accepts steering shaft 114 therethrough. It also secures steering shaft 114 to rear frame assembly 84. Left and right braces 122, 124 include left and right brackets 130, 132 at their lower portions. Left and right brackets 130, 132 secure left and right braces 122, 124 to tunnel 86 of snowmobile 22.

It should be noted that, while the construction of frame assembly 84 is illustrated involves the use of tubular members, frame assembly 84 may also be constructed according to a monocoque or pseudo-monocoque technique. A monocoque construction is one where a single sheet of material is attached to an underlying frame (such as with the construction of an aircraft). The skin applied to the frame adds rigidity to the underlying frame structure. In a similar manner, a pseudo-monocoque technique provides a rigid structure by providing a frame constructed from a single sheet of material.

Instead of constructing frame assembly 84 from a number of tubular members, frame assembly 84 may be constructed from a single sheet of material (such as aluminum) that has been pressed or molded into the appropriate shape using a pseudo-monocoque manufacturing technique. As would be understood by those skilled in the art, this would result in a construction that has a high strength with a low weight.

FIG. 7 illustrates a forward support assembly 134 (also called front triangle 134), which connects to bracket 126 and extends forwardly of bracket 126. Forward support assembly 134 includes a bracket 136 at its rear end that connects to bracket 126 of frame assembly 84 (preferably by welding). Forward support assembly 134 also has left and right braces 138, 140 that extend forwardly and downwardly from bracket 136 and are connected thereto preferably by welding. Left and right braces 138, 140 are connected at their forward ends by a cross-member 142, which includes a plurality of holes 144 therein to lighten the weight thereof. Left and right connecting brackets 145, 146 are connected to cross-member 142. Left and right connecting brackets 145, 146 connect, in turn, to front suspension 110.

FIGS. 8, 9, and 10 illustrate upper column 118 in greater detail. As described above, upper column 118 is essentially an inverted U-shaped member that is preferably tubular in shape to facilitate its construction. Upper column 118 preferably is bent into the appropriate shape from a straight tube with the dimensions shown. As would be understood by those skilled in the art, however, upper column 118 need not be made as a tubular member.

Upper column 118 has left and right legs 148, 150 that extend downwardly from an apex 152. A bracket 154 is disposed at apex 152 for connection to bracket 126 of frame assembly 84. Preferably, bracket 154 is welded at the apex of upper column 118 (however any other suitable attachment means is possible). Left leg 148 includes a bracket 156 at its lower-most portion that connects left leg 148 to engine cradle 88. Similarly, right leg 150 includes a bracket 158 at its lower-most portion to connect right leg 150 to engine cradle 88. Preferably, brackets 156, 158 are welded to upper column 118. Left and right legs 148, 150 preferably attach to engine cradle 88 via bolts or other suitable fasteners.

Figure 12:
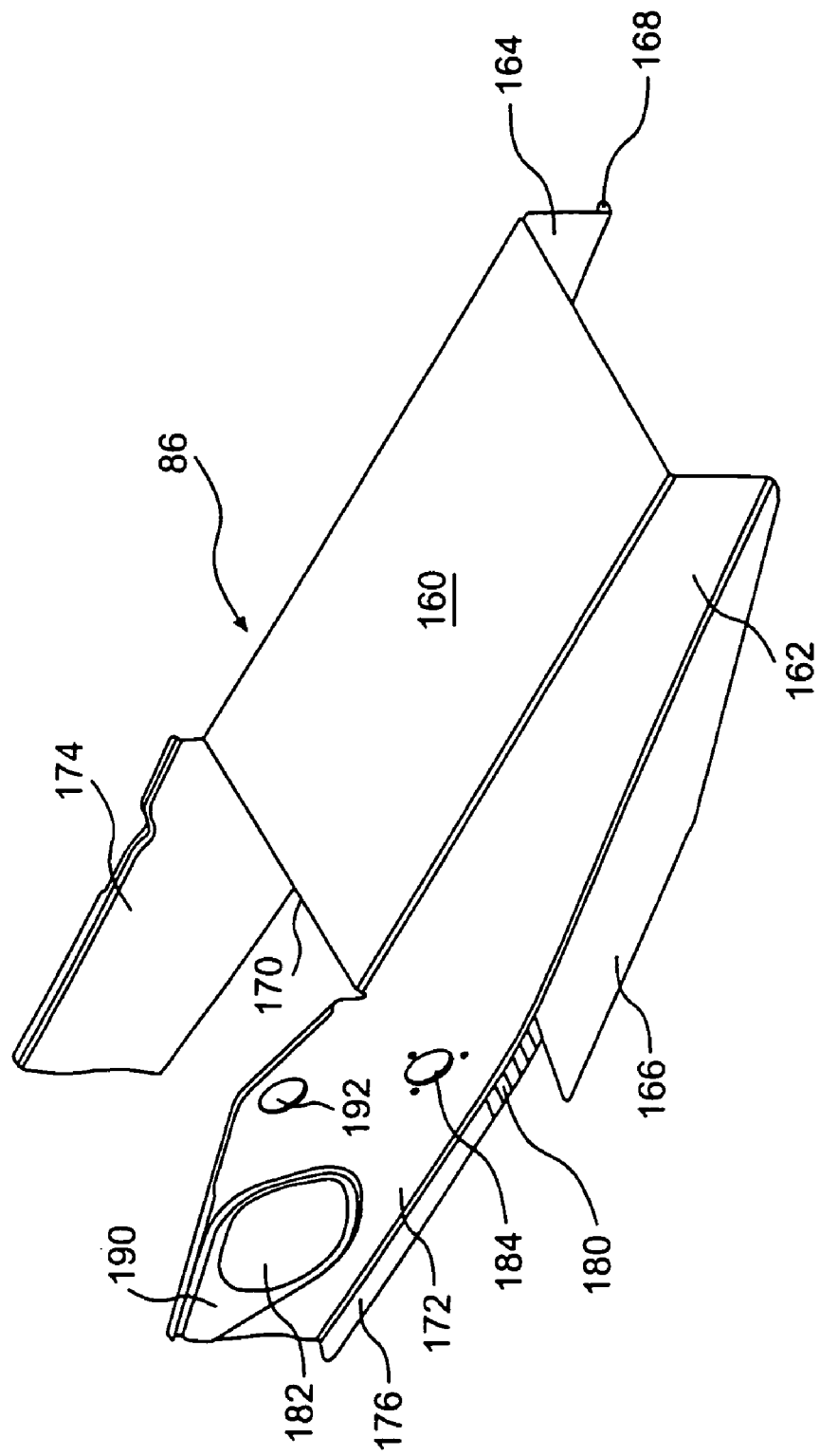
FIG. 12 is another perspective illustration, from the rear left side, of the tunnel portion of the present invention shown in FIG. 11.

FIGS. 11 and 12 illustrate tunnel 86 in greater detail. Tunnel 86 includes a top plate 160 with left and right downwardly extending side plates 162, 164. A left footrest 166 extends outwardly from the bottom of left side plate 162. Similarly, a right footrest 168 extends outwardly from the bottom portion of right side plate 164. Left and right footrests 166, 168 provide a location along tunnel 86 onto which rider 24 may place his or her feet while operating snowmobile 22.

Left side plate 162 extends forwardly beyond the front portion 170 of tunnel 86 to form a left engine cradle wall 172. Similarly, right side plate 164 extends forwardly of front end 170 of tunnel 86 to form right engine cradle wall 174. At the lower edge of left and right engine cradle walls 172, 174, there are laterally extending portions 176, 178, which serve to strengthen left and right engine cradle walls 172, 174. Removable elements 180 extend between left foot rest 166 and left laterally extending portion 176. Removable portions 180 may or may not be removed between left foot rest 166 and left laterally extending portion 176. FIG. 11 shows removable portions 180 removed, while FIG. 12 shows removable portions 180 not removed. It should be noted that the same removable portions 180 may or may not extend between right foot rest 168 and right laterally extending portion 178.

Left engine cradle wall 172 preferably includes an opening 182 therethrough. Opening 182 permits the shafts from transmission 106 to pass therethrough. Unlike left engine cradle wall 172, right engine cradle wall 174 does not include such an opening. Instead, right engine cradle wall 174 is essentially solid. Due to its construction, right engine cradle wall 174 reflects radiant heat from engine 104 back to engine 104 to assist in minimizing heat dissipation from engine 104. Left and right openings 184, 186 are provided through left and right engine cradle walls 172, 174 so that a drive shaft 188 may pass therethrough. Drive shaft 186 connects to endless track 102 for propulsion of snowmobile 22. Opening 182 may include a member 189 about its periphery, also as illustrated in FIGS. 11 and 12, that provides clearance for the engine. Left engine cradle wall 172 also includes an opening 192 above opening 184 through which a shaft passes for part of transmission 106.

Figure 13:
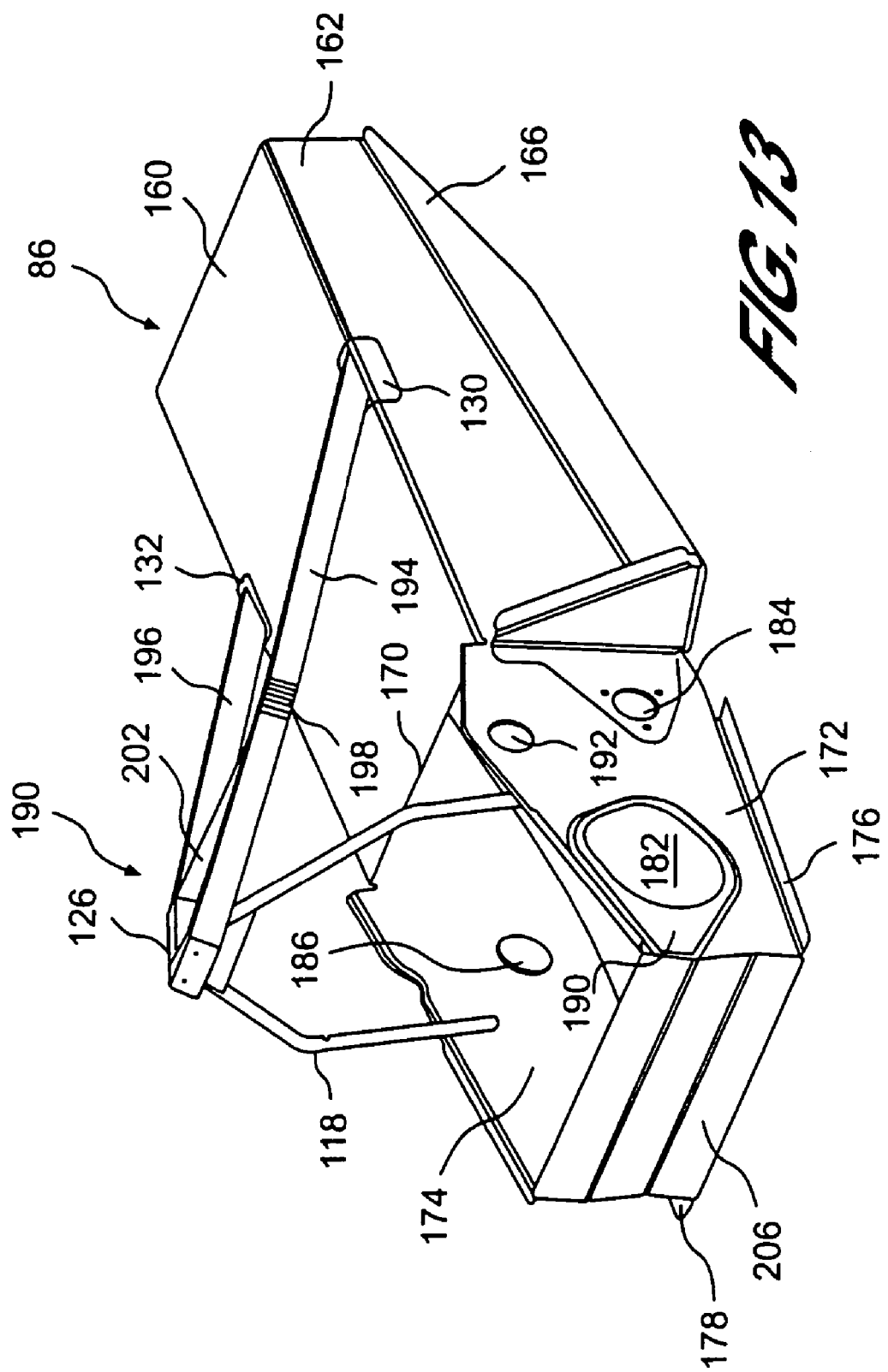
FIG. 13 is a perspective illustration, from the front left side, showing the combination of the frame assembly depicted in FIG. 6 connected to the tunnel portion depicted in FIGS. 11 and 12.
Figure 14:
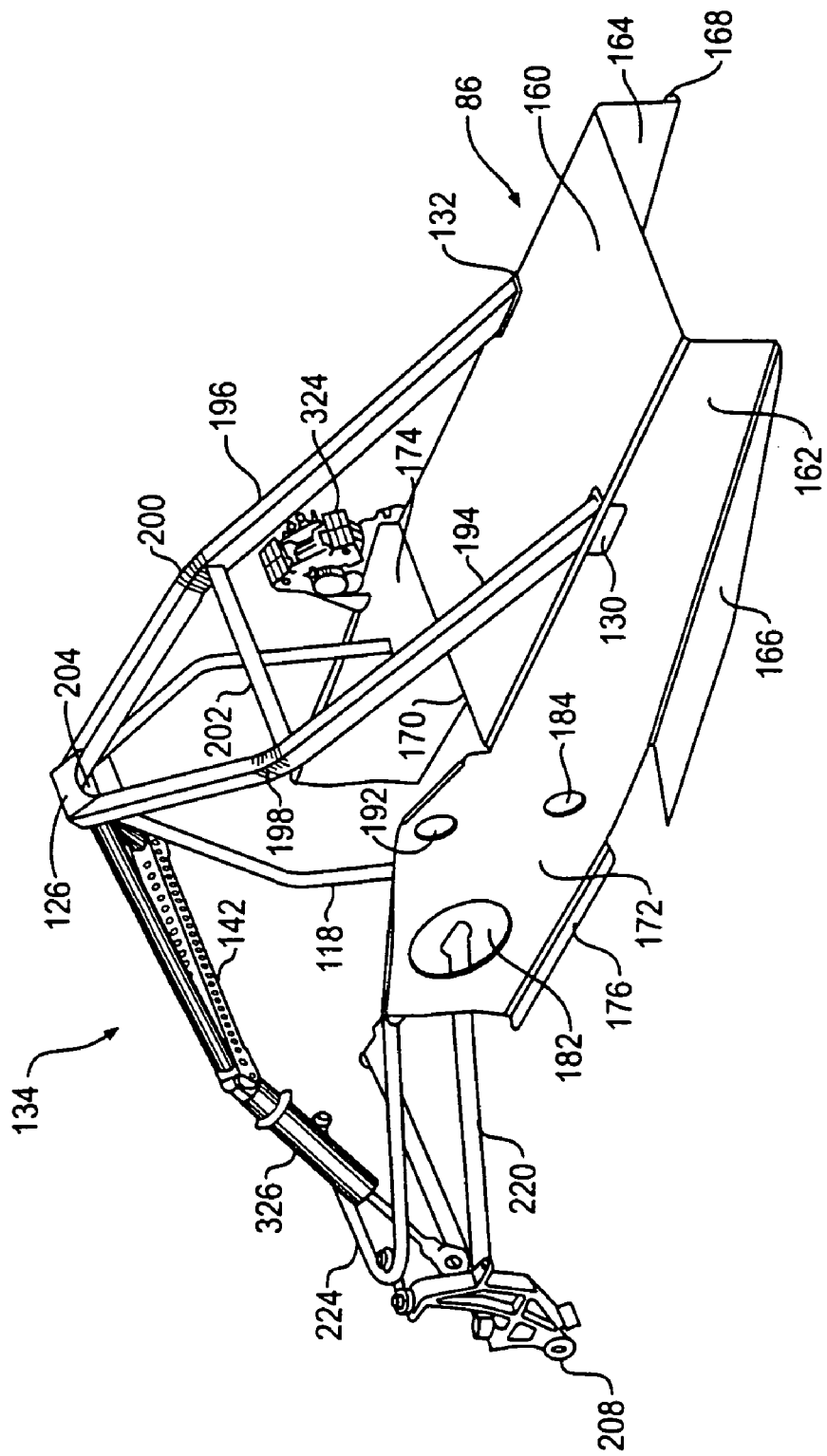
FIG. 14 is a perspective illustration, from the rear left side, showing the combination of the frame assembly depicted in FIG. 6 connected to the tunnel portion depicted in FIGS. 11 and 12 and also showing a portion of a front suspension assembly.

FIGS. 13 and 14 illustrate a combination of a variation of frame assembly 190 connected to tunnel 86. Frame assembly 190 includes upper column 118 as illustrated in FIGS. 8-10. However, frame assembly 190 differs somewhat from frame assembly 84. For example, left and right braces 194, 196 are shaped so that they extend outwardly from the positions defined by left and right braces 122, 124. As illustrated, left and right braces 194, 196 include elbows 198, 200. A cross-brace 202 optionally may be placed between left and right braces 194, 196 to add structural rigidity to frame assembly 190. As with frame assembly 84, a bracket 126 is provided at apex 204 where left and right braces 194, 196 meet one another. Forward support assembly 134 is the same as depicted in FIG. 7. A front engine cradle wall 206 is also shown in FIG. 13.

Figure 15:
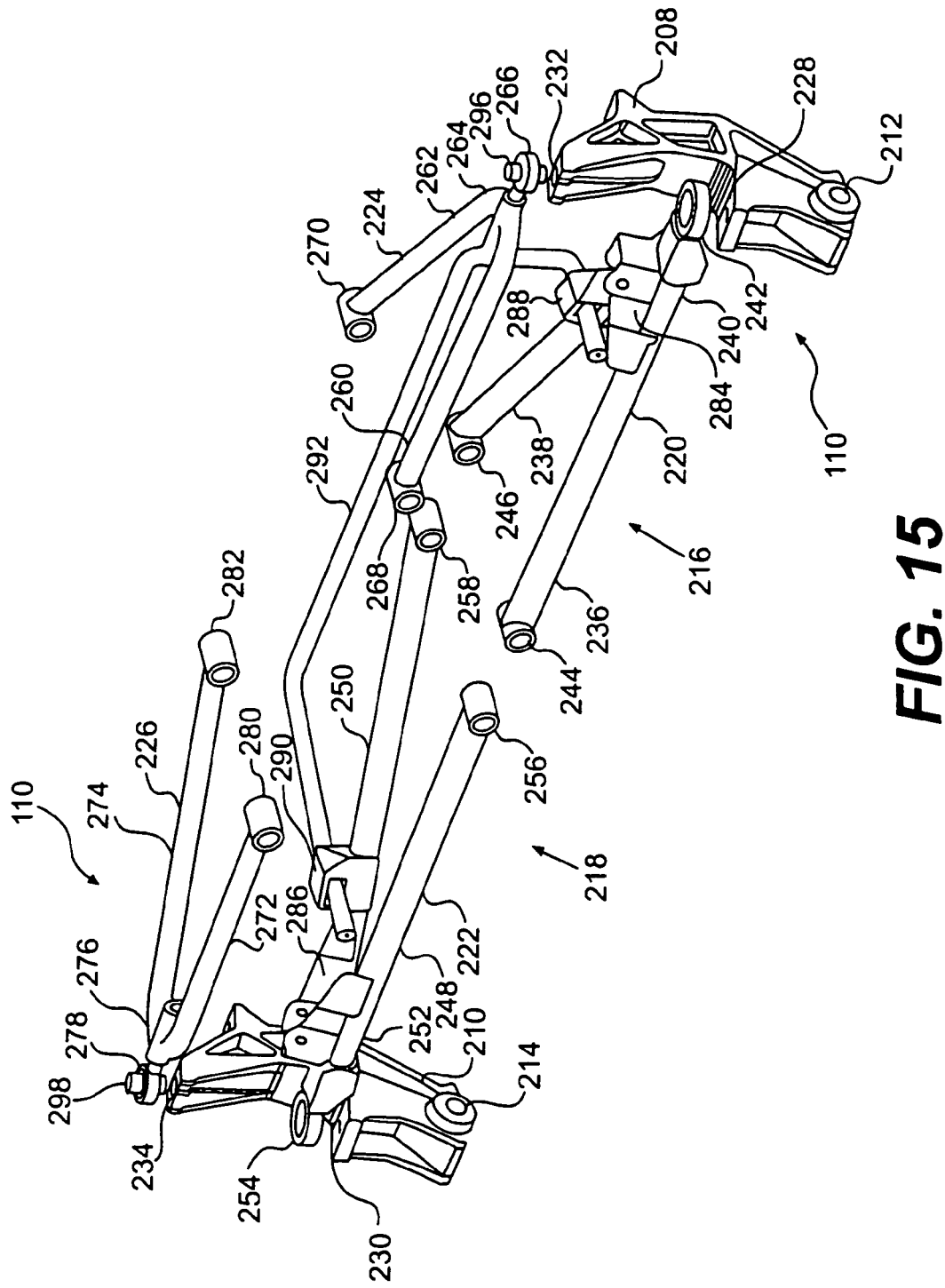
FIG. 15 is a perspective illustration, from the front left side, of some of the components that are part of the front suspension assembly depicted in FIG. 14.
Figure 16:
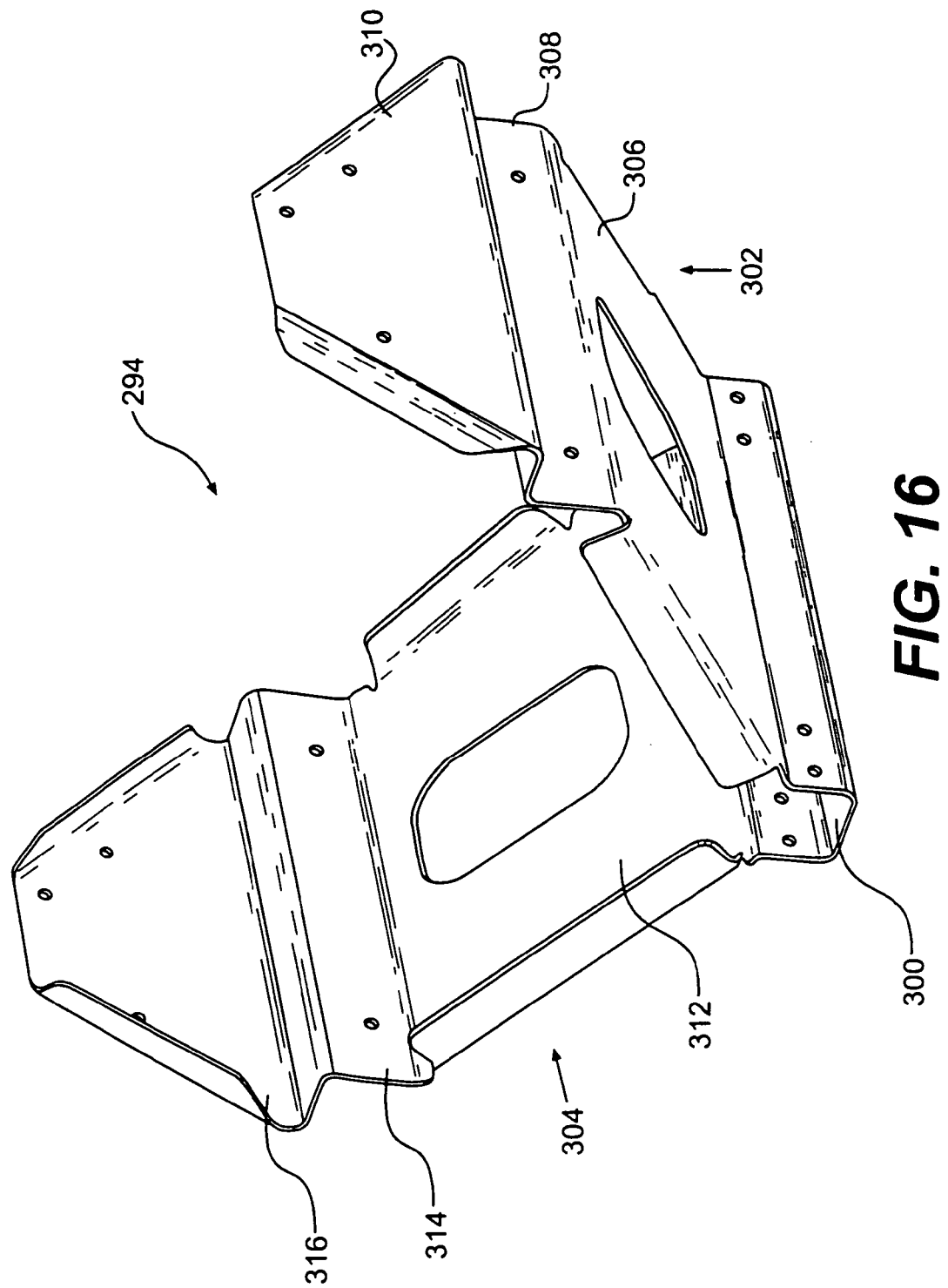
FIG. 16 is a perspective illustration, from the front left side, of a portion of a sub-frame that is part of the front suspension assembly illustrated in FIG. 15.
Figure 17:
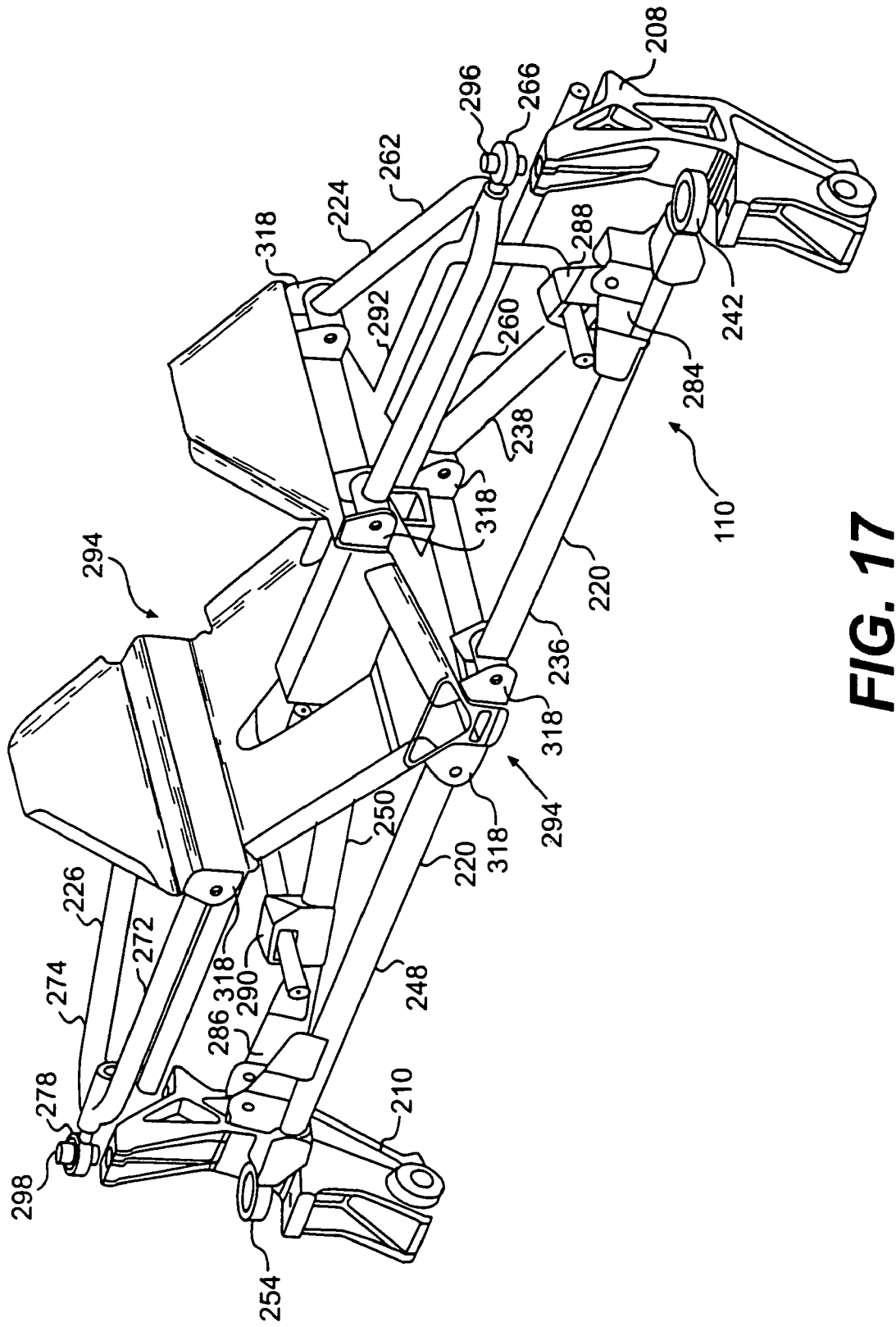
FIG. 17 is another perspective illustration, from the front left side, of the front suspension assembly for a snowmobile, constructed according to the teachings of the present invention, showing the positional relationship between the parts illustrated in FIG. 15 and the sub-frame illustrated in FIG. 16.

FIGS. 15-17 illustrate various aspects of front suspension 110 and associated structures. While the figures illustrate the embodiment preferably used in combination with snowmobile 22, it should be recognized that front suspension 110 may also be used in combination with a wheeled vehicle, as will be discussed in connection with FIGS. 23-27.

Front suspension 110 includes left and right ski legs 208, 210. Left and right ski legs 208, 210 are preferably made from aluminum and are preferably formed as extrusions. While an aluminum extrusion is preferred for left and right ski legs 208, 210, those skilled in the art would appreciate that ski legs could be made from any suitable material and in any acceptable manner that would provide similar strength and low weight characteristics. Left and right ski legs 208, 210 include holes 212, 214 through which a fastener (not shown) is disposed to pivotally connect skis 32 to snowmobile 22, as shown in FIG. 2.

Left and right ski legs 208, 210 are movably connected to left and right support arms 216, 218. Left and right suspension arms 216, 218 include lower left and right suspension support arms 220, 222 and upper left and right suspension support arms 224, 226.

As shown in FIGS. 15 and 17, lower left suspension support arm 220 connects to left ski leg at lower left attachment point 228 preferably through a ball joint (not shown) so that left ski leg 208 may pivot and rotate with respect to lower left suspension support arm 220. Similarly, lower right suspension support arm 222 connects to right ski leg 210 at lower right attachment point 230, preferably through a ball joint. Upper left suspension support arm 224 preferably attaches to left ski leg 208 at upper left attachment point 232, preferably through a ball joint or other suitable means. In addition, upper right suspension support arm 226 connects to right ski leg 210 at upper right attachment point 234 through a ball joint or other suitable means.

Lower left suspension support arm 220 includes front and rear members 236, 238, which meet at apex 240 where they connect with left lower eyelet 242. Front member 236 includes a joint 244 at an inner end, and rear member 238 includes a joint 246 also at an inner end. Similarly, lower right suspension support arm 222 includes front and rear members 248, 250, that meet at apex 252 where they connect with right lower eyelet 254. Front member 248 includes a joint 256 at an inner end and rear member 250 includes a joint 258 also at an inner end.

Upper left suspension support arm 224 includes front and rear members 260, 262, which meet at apex 264 where they connect with upper left eyelet 266. Front member 260 includes a joint 268 at an inner end, and rear member 262 includes a joint 270 also at an inner end. Similarly, upper right suspension support arm 226 includes front and rear members 272, 274, which meet at apex 276 where they connect with upper right eyelet 278. Front member 272 includes a joint 280 at an inner end and rear member 274 includes a joint 282 also at an inner end.

At a point inward from apex 240, lower left suspension support arm 220 includes a left bracket 284 that is connected to and extends partially along front and rear members 236, 238. Similarly, lower right suspension support arm 222 includes a right bracket 286 that is connected to and extends partially along front and rear members 248, 250. Slidably attached to rear member 238 of lower left suspension arm 220 is a left pivot block 288. A right pivot block 290 is slidably attached to rear member 250 of lower right suspension support arm 222. A stabilizer bar 292 is connected between left and right pivot blocks 288, 290. Stabilizer bar 292 is adapted to slide and pivot by way of left and right pivot blocks 288, 290. These blocks 288, 290 slide relative to left and right lower suspension support arms 220, 222. Left and right bushings 296, 298 are provided to allow some rotation of the components of front suspension 110. Left and right ski legs 208, 210 rotatably connect to front suspension 110 for facilitating movement of skis 32.

FIG. 16 illustrates sub-frame 294, which is essentially a unitary, V-shaped structure. Sub-frame 294, which forms a part of front suspension 110, includes a central channel 300 flanked on either side by left and right upwardly extending panels 302, 304. Left upwardly extending panel 302 includes a left lower panel 306 connected to left transition structure 308 and left triangular panel 310. Similarly, right upwardly extending panel 304 includes a right lower panel 312 connected to right transition structure 314 and right triangular panel 316. While sub-frame 294 preferably is a unitary structure (an integrally-formed structure), sub-frame 294 need not be constructed in this manner. As would be understood by those skilled in the art, sub-frame 294 may be assembled from a number of separate elements that are connected together by any suitable means such as by welding or by fasteners.

As illustrated in FIG. 17, sub-frame 294 is an integral part of front suspension 110 and connects to left support arm 216 and right support arm 218 through a number of brackets 318 connected at various locations on sub-frame 294.

Figure 18:
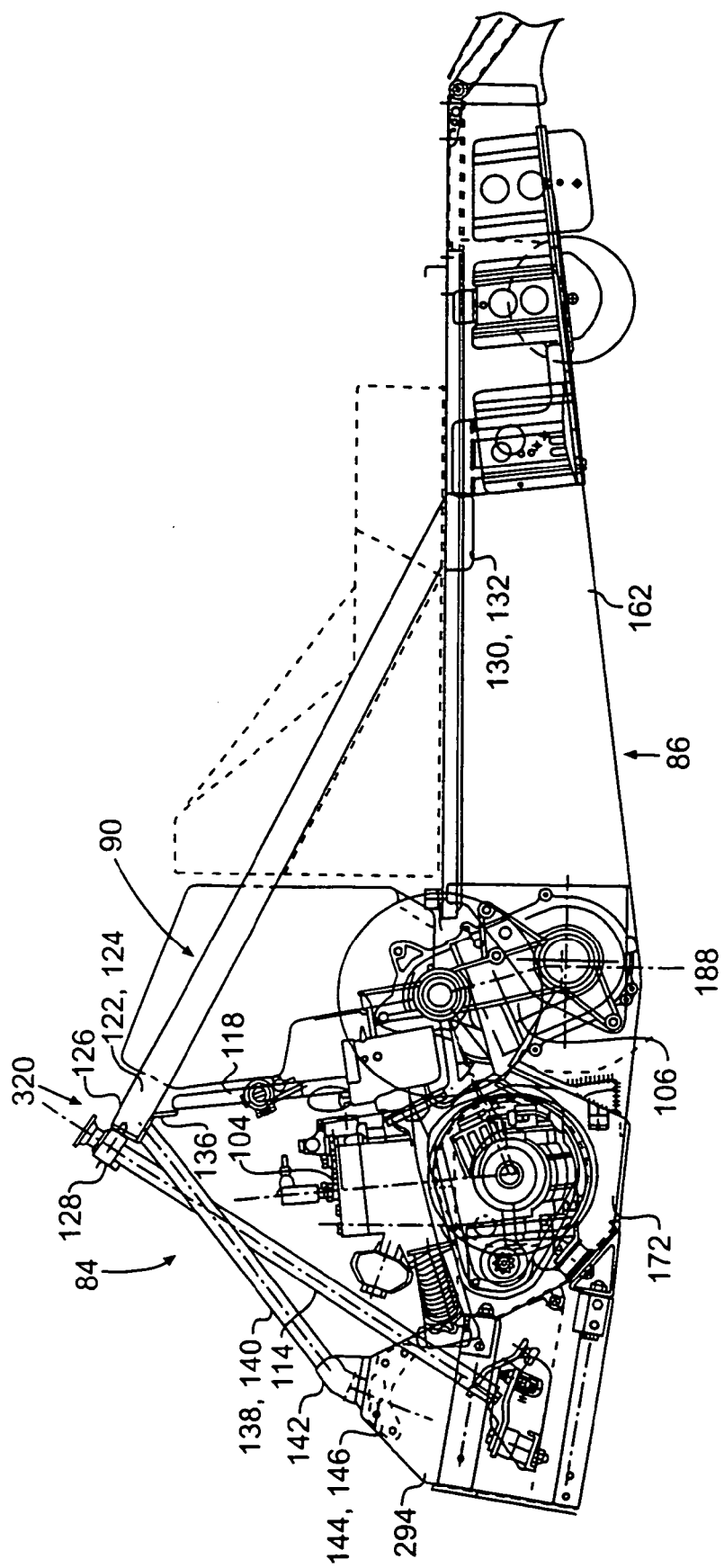
FIG. 18 is a side view schematic of the frame assembly of the present invention showing the positional relationship between the frame assembly and the engine, among other components.

FIG. 18 is a side view of one embodiment of the completed frame assembly 84 of the present invention. As shown, overarching frame elements 90 are connected between tunnel 86 and sub-frame 294 to establish an apex 320 to which steering shaft 114 is connected.

Figure 19:
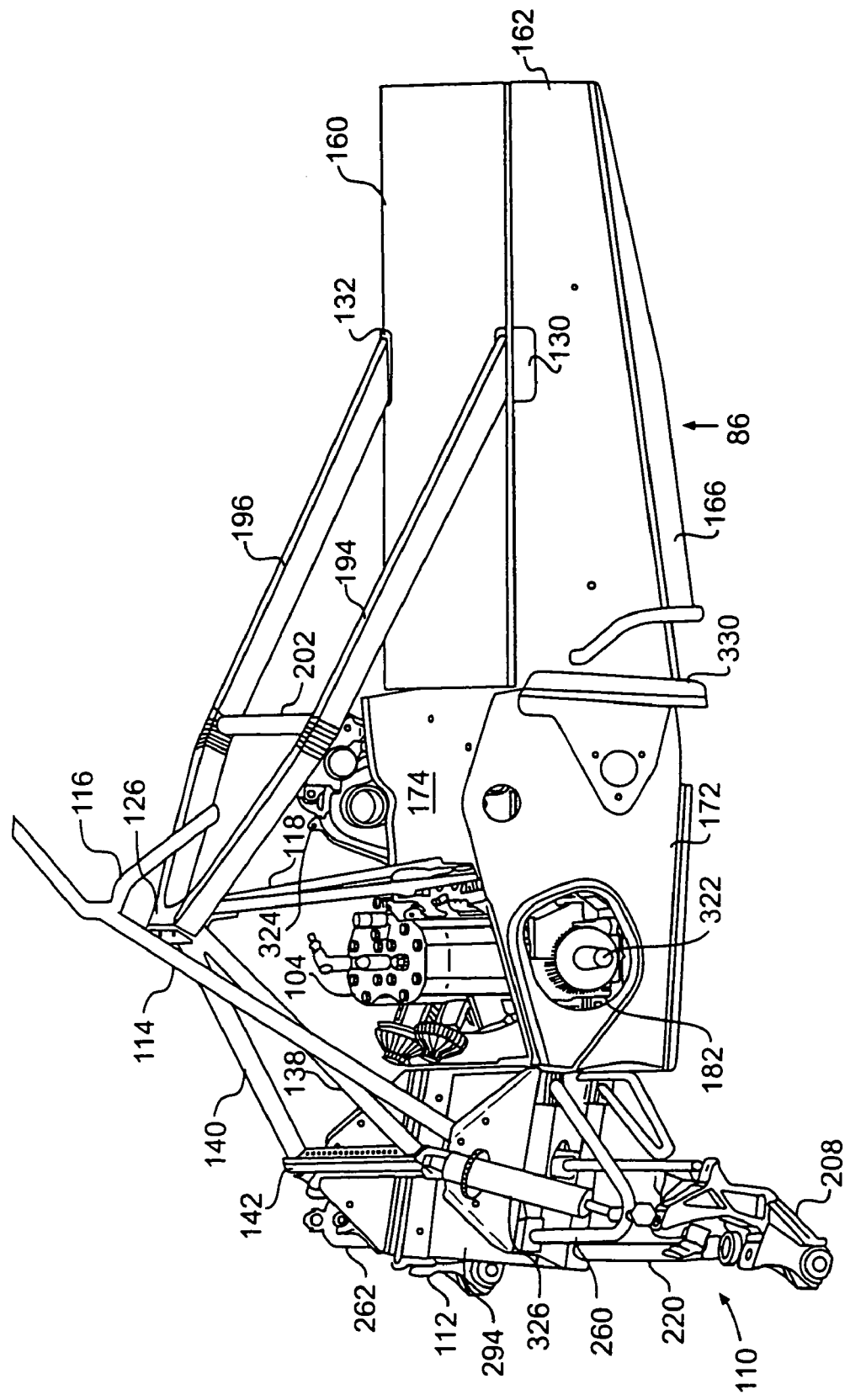
FIG. 19 is a perspective illustration, from the left side, of the frame assembly according to the teachings of the present invention, also showing the positional relationship between the frame assembly, the engine, and the front suspension.

FIG. 19 is a perspective illustration of the embodiment of the present invention shown in FIGS. 13 and 14 to assist in understanding the scope and content of the present invention. As illustrated, drive shaft 322 extends through left opening 182 in left engine cradle wall 172. A portion of gearbox 324 is also visible. In addition, left shock absorber 326, which is connected between cross-member 142 and left support arm 216, is illustrated. Right shock absorber, which extends between cross-member 142 and right support arm 218 is visible in FIG. 20. Furthermore, left forward foot wall 330 is shown at the forward end of left foot rest 166. A similar forward foot wall may be provided on the right side of snowmobile 22 (but is not illustrated herein).

Figure 20:
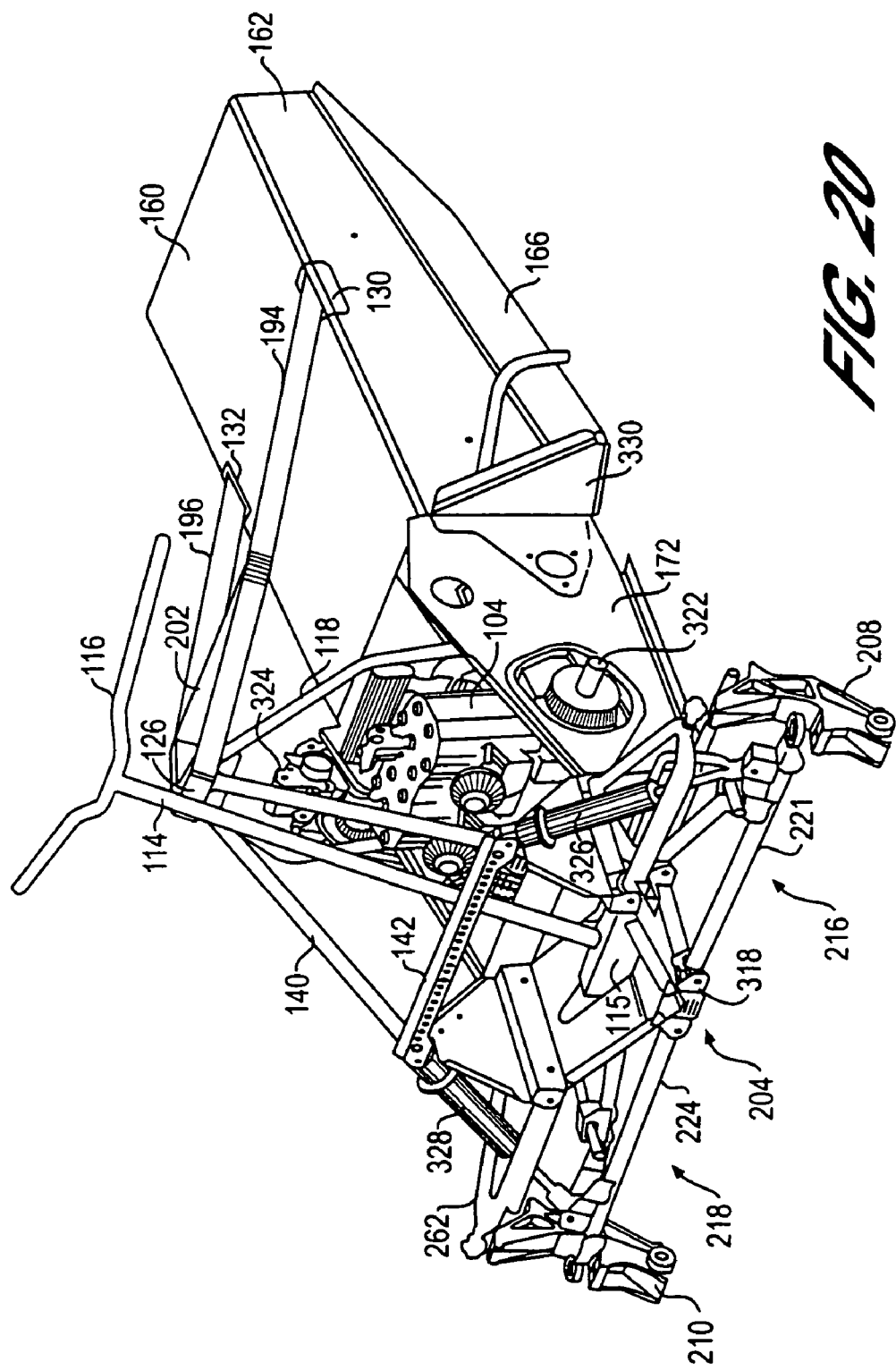
FIG. 20 is another perspective illustration, from the front left side, of the combined frame assembly and tunnel portion constructed according to the teachings of the present invention, also showing the positional relationship between the frame assembly, the engine, and the front suspension.
Figure 21:
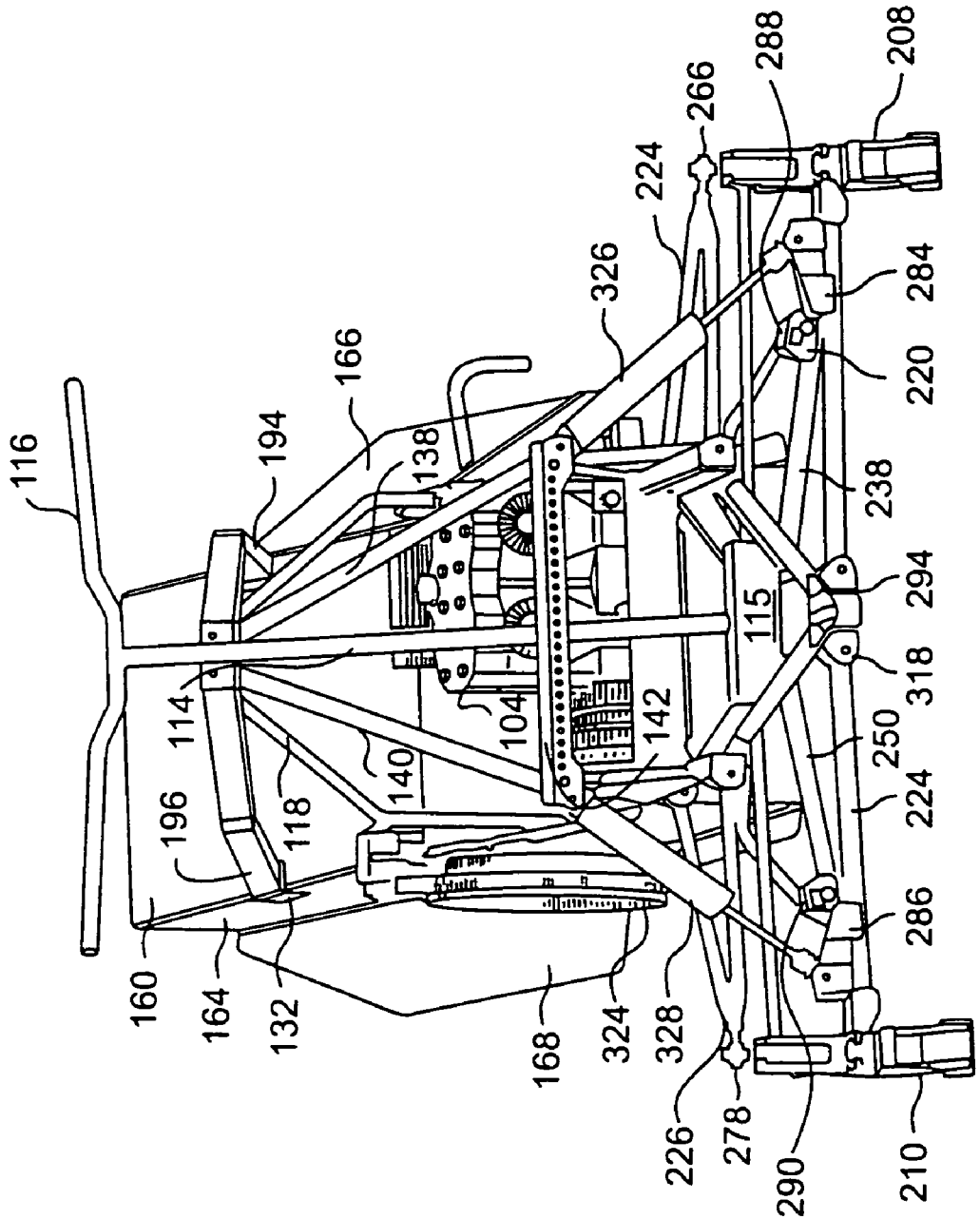
FIG. 21 is a front perspective illustration of the embodiment depicted in FIG. 20.
Figure 22:
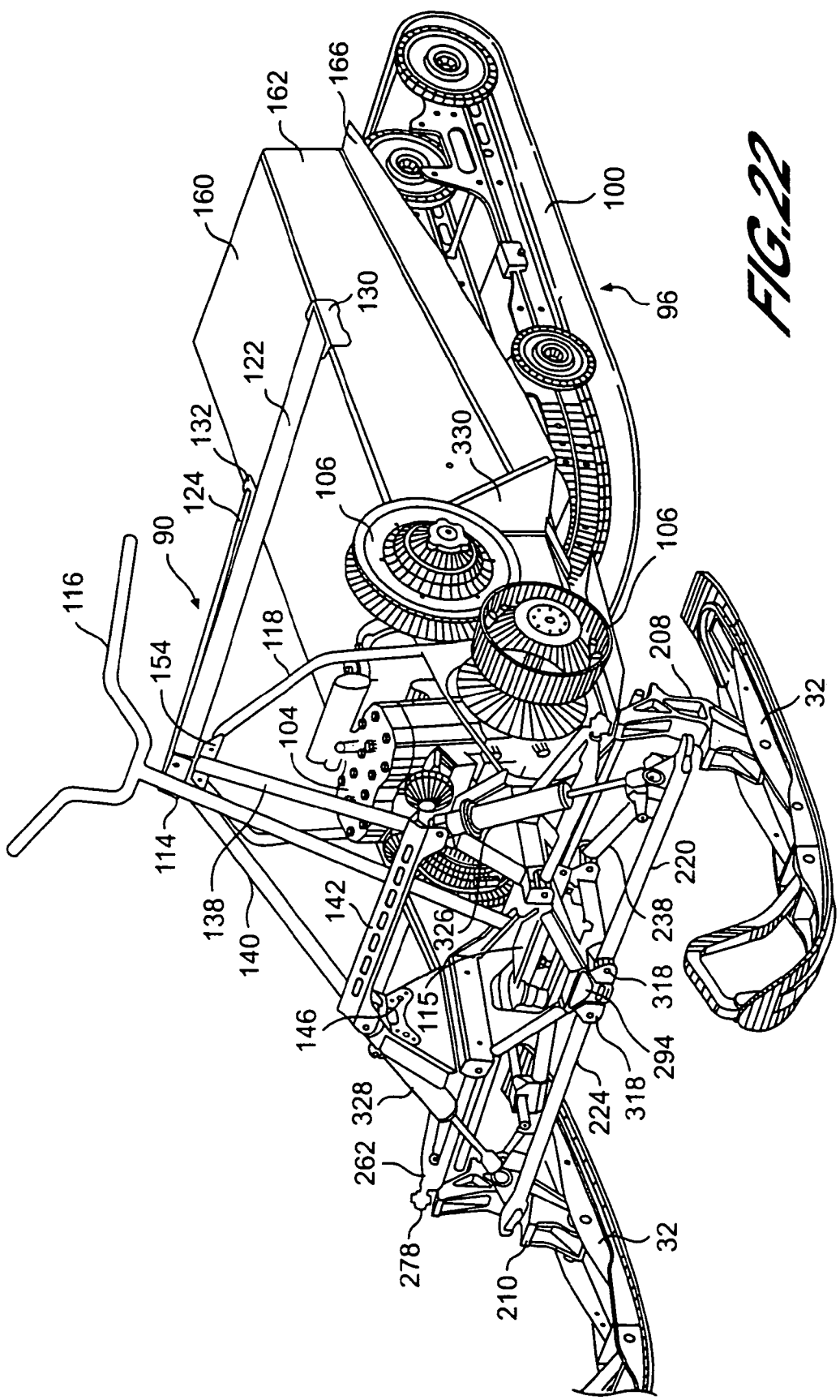
FIG. 22 is a perspective illustration of a slightly different embodiment from the one depicted in FIG. 20.

FIGS. 20 and 21 illustrate further details of the present invention by showing the various elements from slightly different perspective views. FIG. 22 illustrates the modified version of the elements of the present invention shown in FIGS. 6 and 7. Here, left and right braces 122, 124 are illustrated instead of left and right braces 194, 196. As discussed previously, left and right braces 122, 124 differ from left and right braces 194, 196 in that they are not bent but, instead, are straight elements of overarching frame 90. The same left and right braces 122, 124 are shown in FIG. 18. As would be understood by those skilled in the art, the two different embodiments of these braces are interchangeable. In addition, their shape may be altered depending on the requirements of the particular vehicle design, as would be understood by those skilled in the art.

Left and right braces 194, 196 are bent to accommodate an airbox (not shown) between them. Left and right braces 122, 124 are not bent because they do not need to accommodate an airbox.

FIG. 20 also illustrates steering gear box 115 at the bottom end of steering shaft 114 that translates the movement of handlebars 116 into a steering motion of skis 32.

FIGS. 23-27 illustrate alternate embodiments of the present invention that are designed for a wheeled vehicle 332, rather than a snowmobile 22. For the most part, the elements designed for wheeled vehicle 332 are the same as those for snowmobile 22, except for those elements required to attach wheels 334 to wheeled vehicle 332.

In the preferred embodiment of wheeled vehicle 332, the vehicle includes two front wheels 334 and a single rear wheel 336. As would be understood by those skilled in the art, however, wheeled vehicle 332 may be constructed with two rear wheels rather than one. If so, wheeled vehicle 332 would be a four-wheeled vehicle rather than the three-wheeled vehicle shown.

Wheeled vehicle 332 includes a seat 338 disposed over tunnel 86 in the same manner as snowmobile 22. The vehicle includes engine 104 at its forward end, encased by fairings 340. Fairings 340 protect engine 104 and provide wheeled vehicle 332 with an aesthetically pleasing appearance. Engine 104 is connected to CVT 106, which translates the power from engine 104 into motive power for wheeled vehicle 332.

Figure 23:
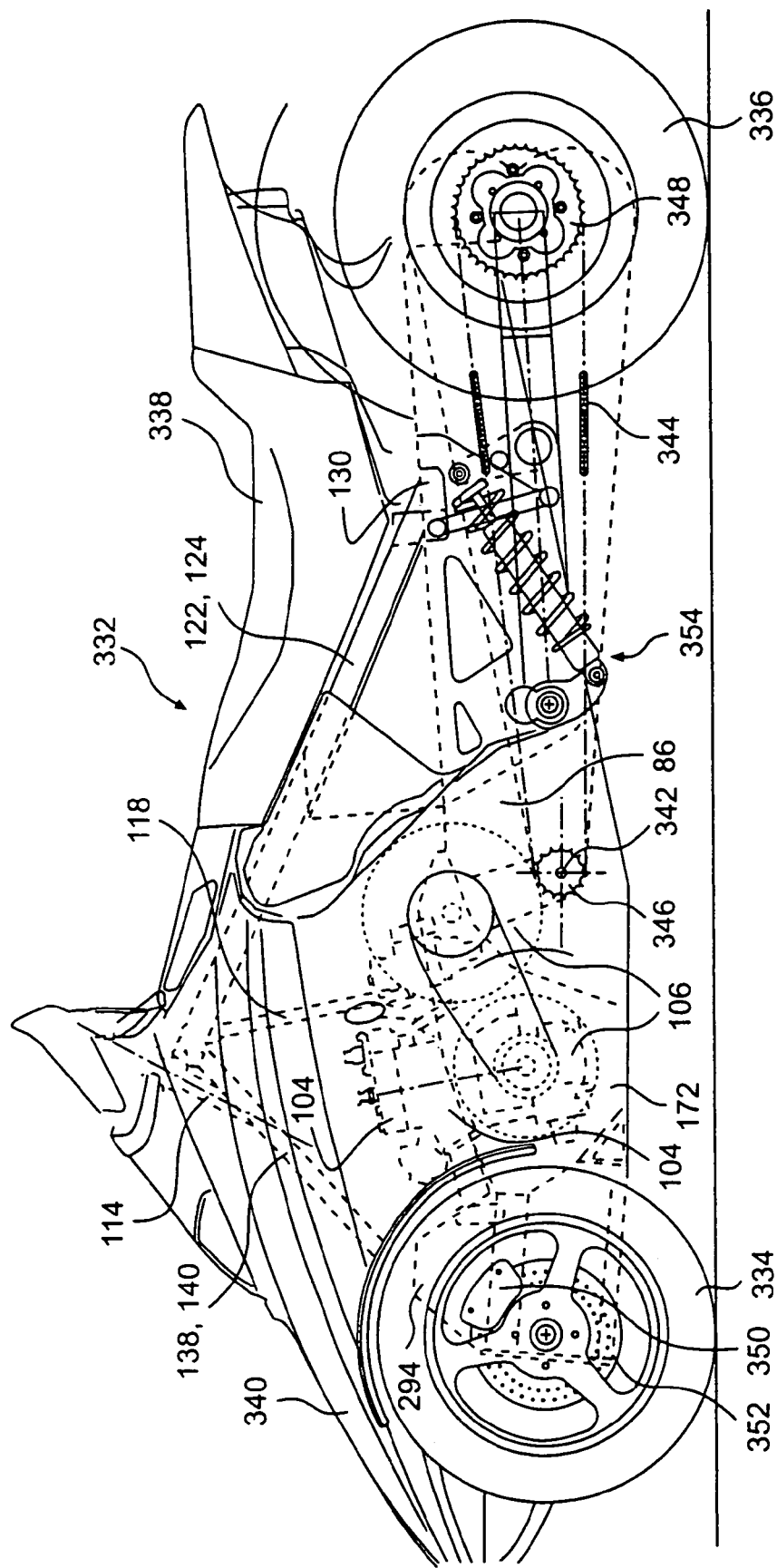
FIG. 23 is a schematic side view illustration of the frame assembly of the present invention as embodied in a wheeled vehicle.

As shown in FIG. 23, CVT 106 is connected by suitable means to drive shaft 342, which is connected to rear wheel 336 by a drive chain 344. A sprocket 346 is connected to drive shaft 342. A similar sprocket 348 is provided on the shaft connected to rear wheel 336. Drive chain 344 is an endless chain that connects sprockets 346, 348 to one another. To stop wheeled vehicle 332 during operation, disc brakes 350 are connected to front wheels 334. Disc brakes 350 clamp onto discs 352 to slow or stop wheeled vehicle 332 in a manner known to those skilled in the art.

A rear suspension 354 is provided under tunnel 86. Rear suspension 354 absorbs shocks associated with the terrain over which wheeled vehicle 332 travels. Rear suspension 354 replaces rear suspension 28 on snowmobile 22.

Figure 24:
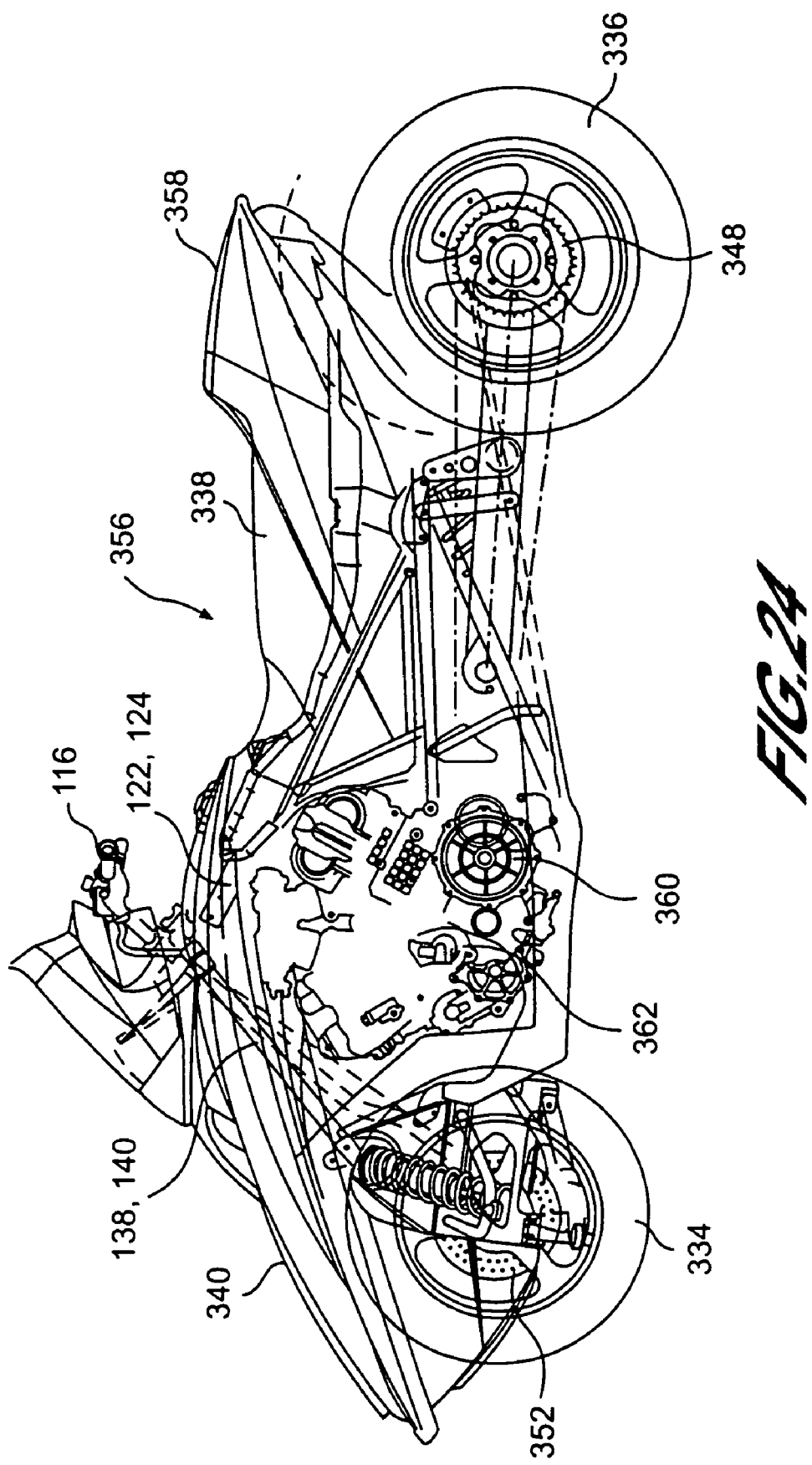
FIG. 24 is a schematic side view illustration of the frame assembly of the present invention as embodied in a slightly modified version of a wheeled vehicle.

FIG. 24 illustrates an alternate embodiment of wheeled vehicle 356. Wheeled vehicle 356 differs in its construction at the rear. Specifically, rear end 358 is shorter than that shown for wheeled vehicle 332. In addition, wheeled vehicle 356 includes a four stroke engine, rather than the two stroke engine 104 illustrated for wheeled vehicle 332. Also, wheeled vehicle 356 includes a manual speed transmission 360 (with a clutch) rather than continuously variable transmission 106, as illustrated with other embodiments of the present invention. Both constructions of the wheeled vehicle, as well as many other variations, are contemplated within the scope of the present invention. In addition, as discussed above, the present invention may be used with a two or four stroke engine (or any other type of engine that provides the motive power for the vehicle).

Figure 25:
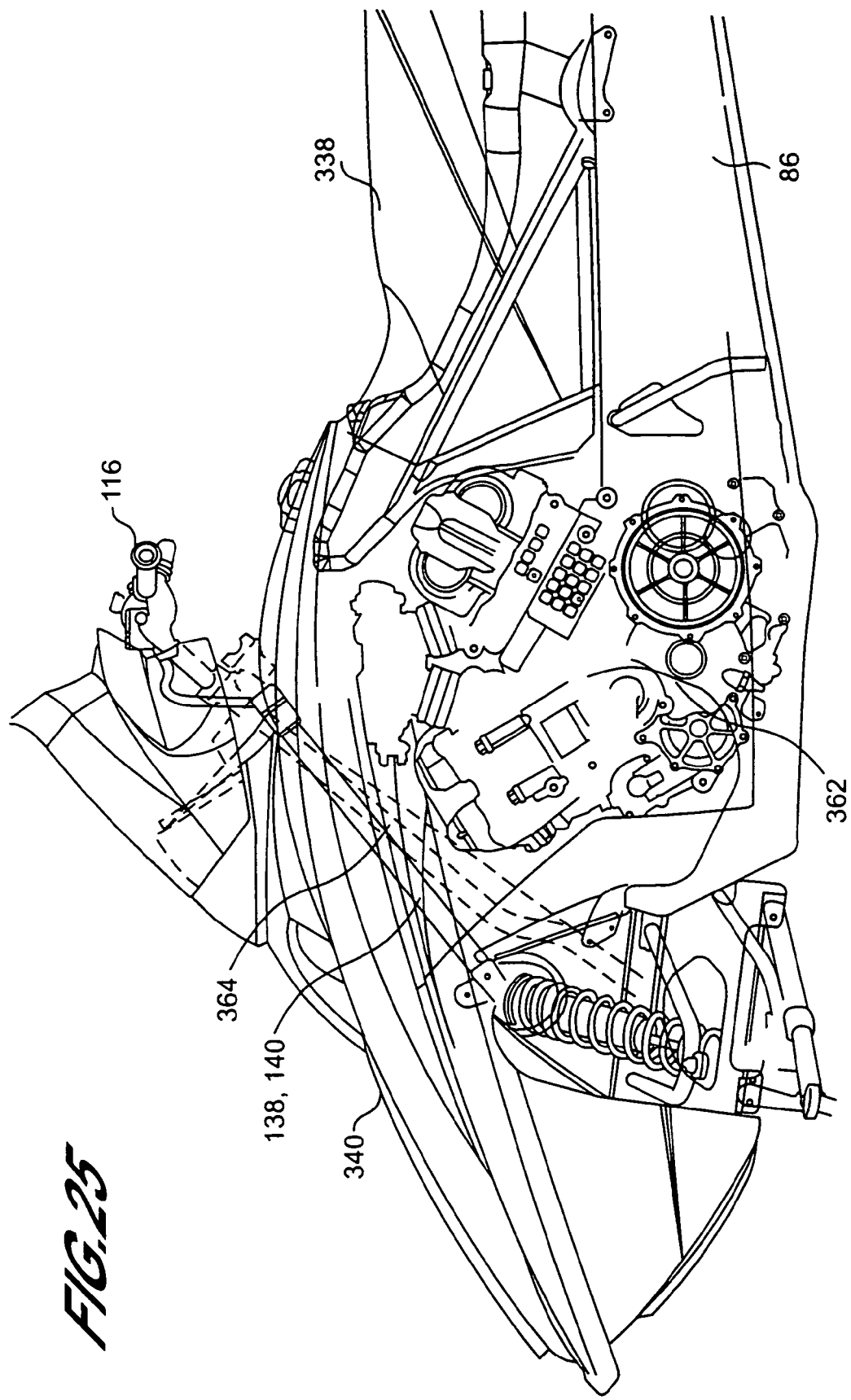
FIG. 25 is an enlarged side view illustration of the frame assembly of the present invention as embodied in the wheeled vehicle shown in FIG. 24.

FIG. 25 illustrates in greater detail the embodiment of the present invention shown in FIG. 24.

Figure 26:
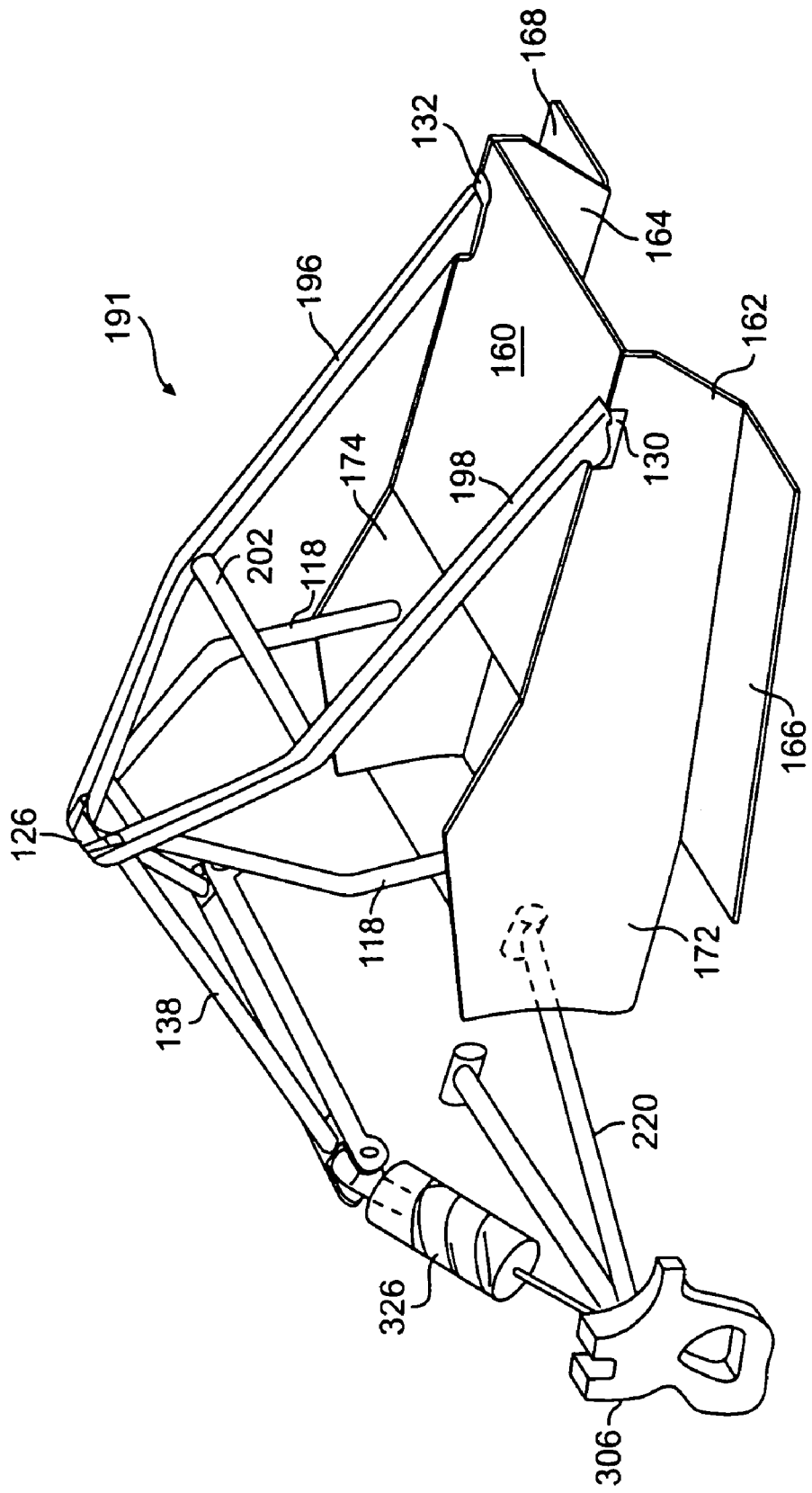
FIG. 26 is a perspective illustration, from the left rear, of the frame assembly of the present invention, showing some of the detail of the front suspension incorporated into the wheeled vehicle shown in FIGS. 23 and 24.
Figure 27:
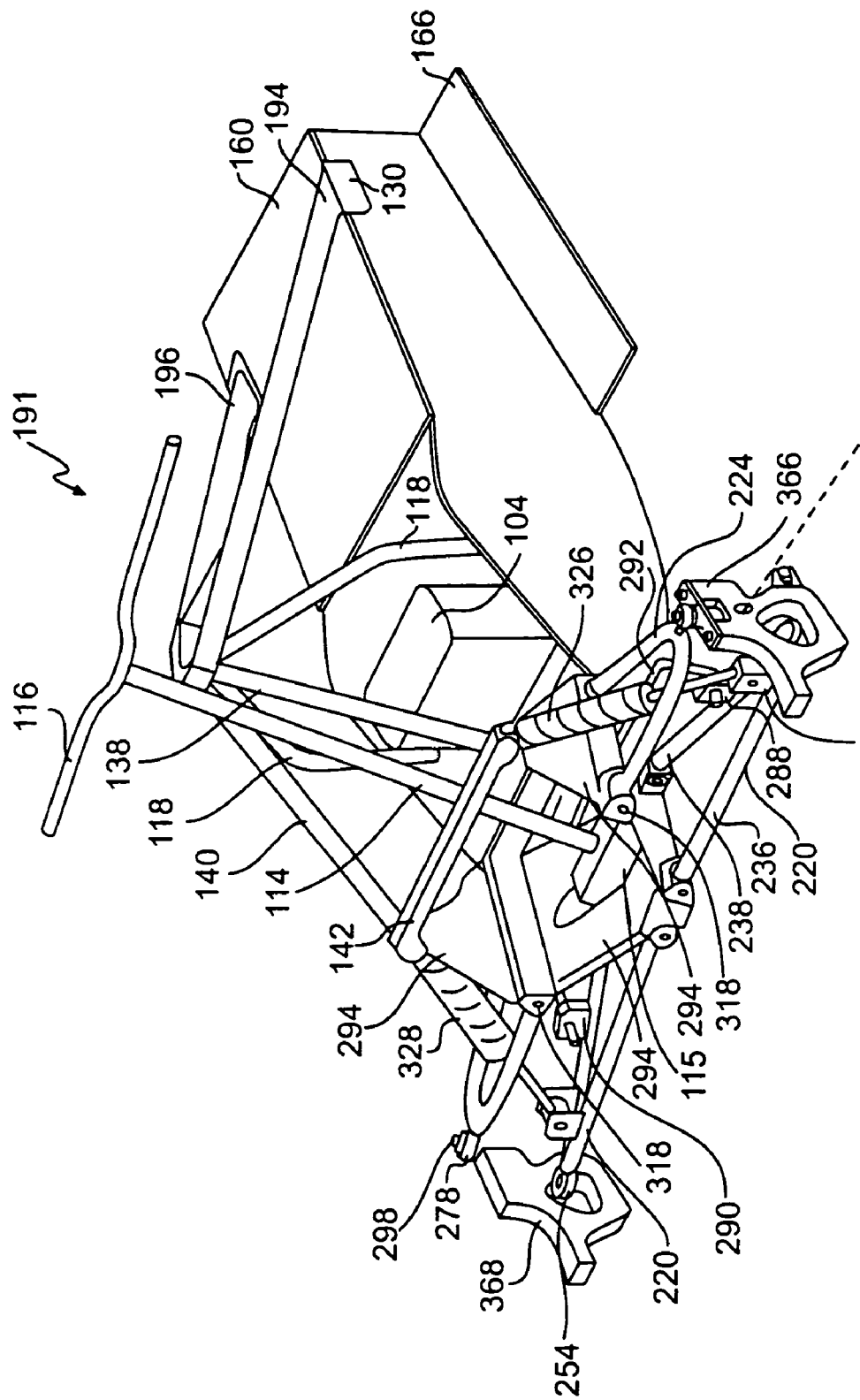
FIG. 27 is a perspective illustration, from the front left, showing the frame assembly of the present invention as depicted in FIG. 26.

FIGS. 26-27 illustrate the basic frame assembly contemplated for wheeled vehicles 332, 356. For either vehicle, the construction of frame assembly 191 is similar to that previously described. This embodiment differs in that left and right wheel knuckles 366, 368 are provided so wheels 334 may be attached thereto. In most other respects, the construction of frame assembly 191 is the same as that previously described.

The variable geometry of steering shaft 364 will now be described in connection with FIGS. 28-34.

Figure 28:
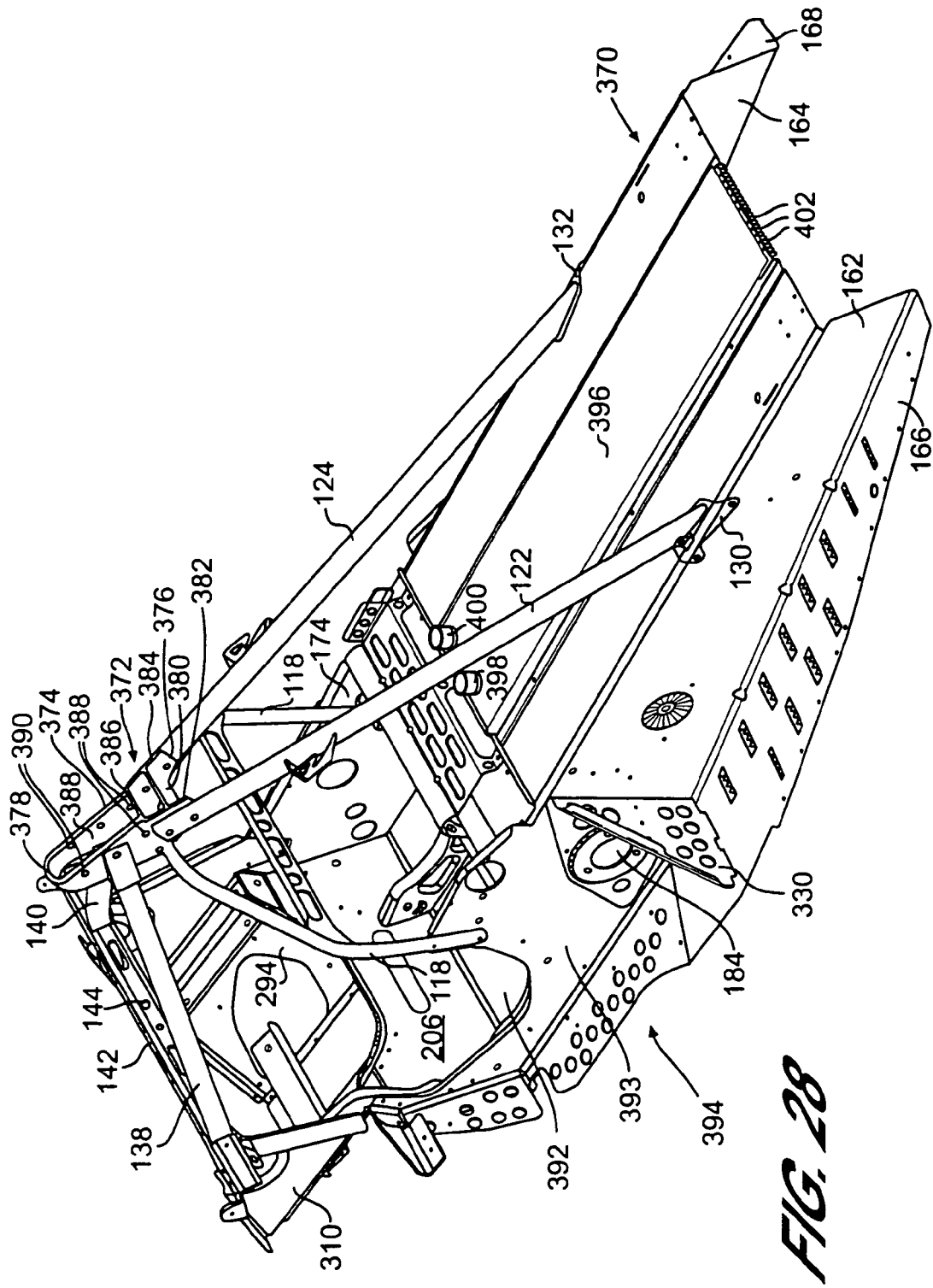
FIG. 28 is a perspective illustration, from the rear left side of an alternate embodiment of the frame assembly of the present invention.

As illustrated in FIG. 28, left brace 122 and right brace 124 extend upwardly from tunnel 370 to apex 372 where they connect to variable geometry steering bracket 374. Upper column 118 extends from left engine cradle wall 376 and right engine cradle wall 174 and also connects to variable geometry steering bracket 374. Forward support assembly 134 extends from sub-frame 294 to variable geometry steering bracket 374.

Figure 29:
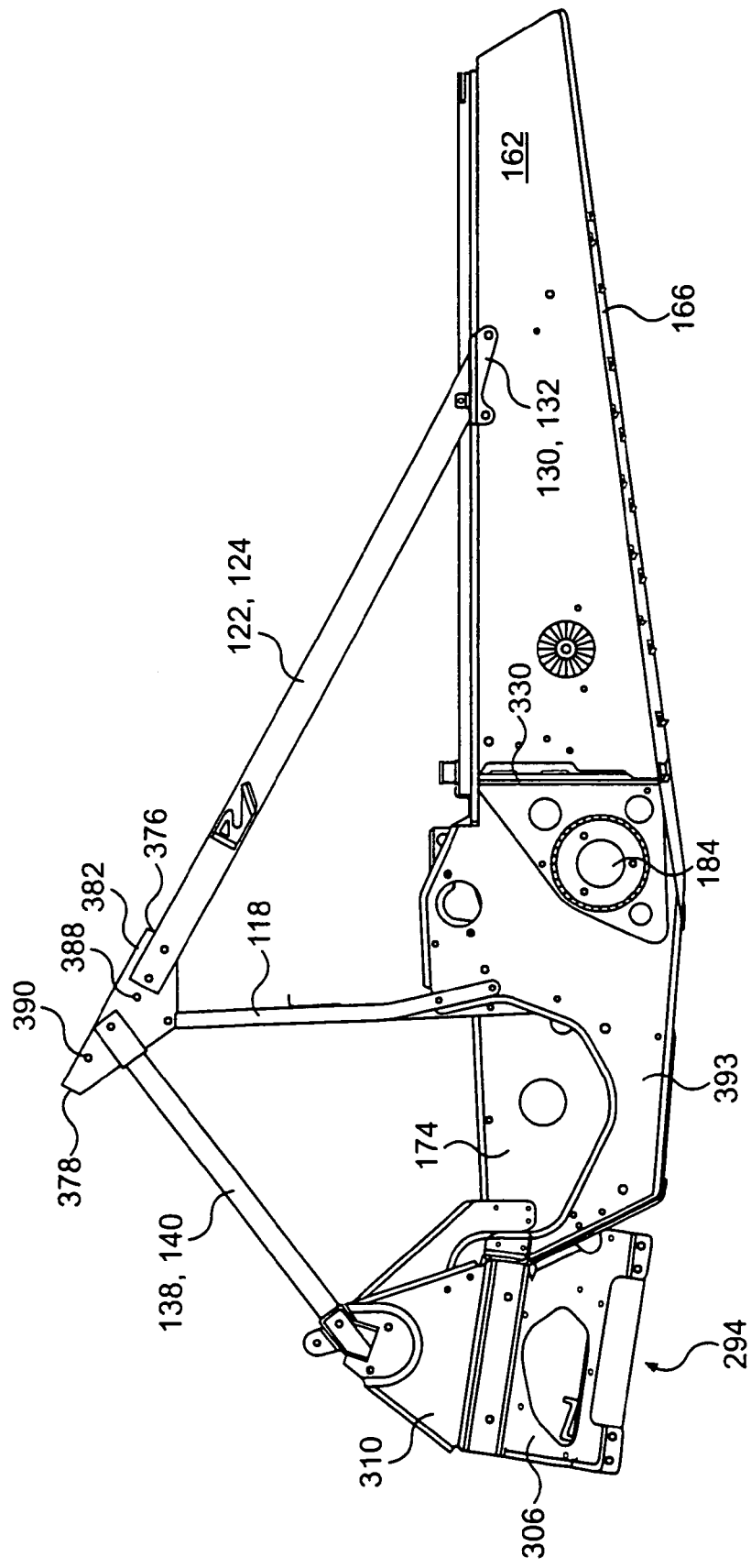
FIG. 29 is a side view illustration of the frame assembly shown in FIG. 28.
Figure 30:
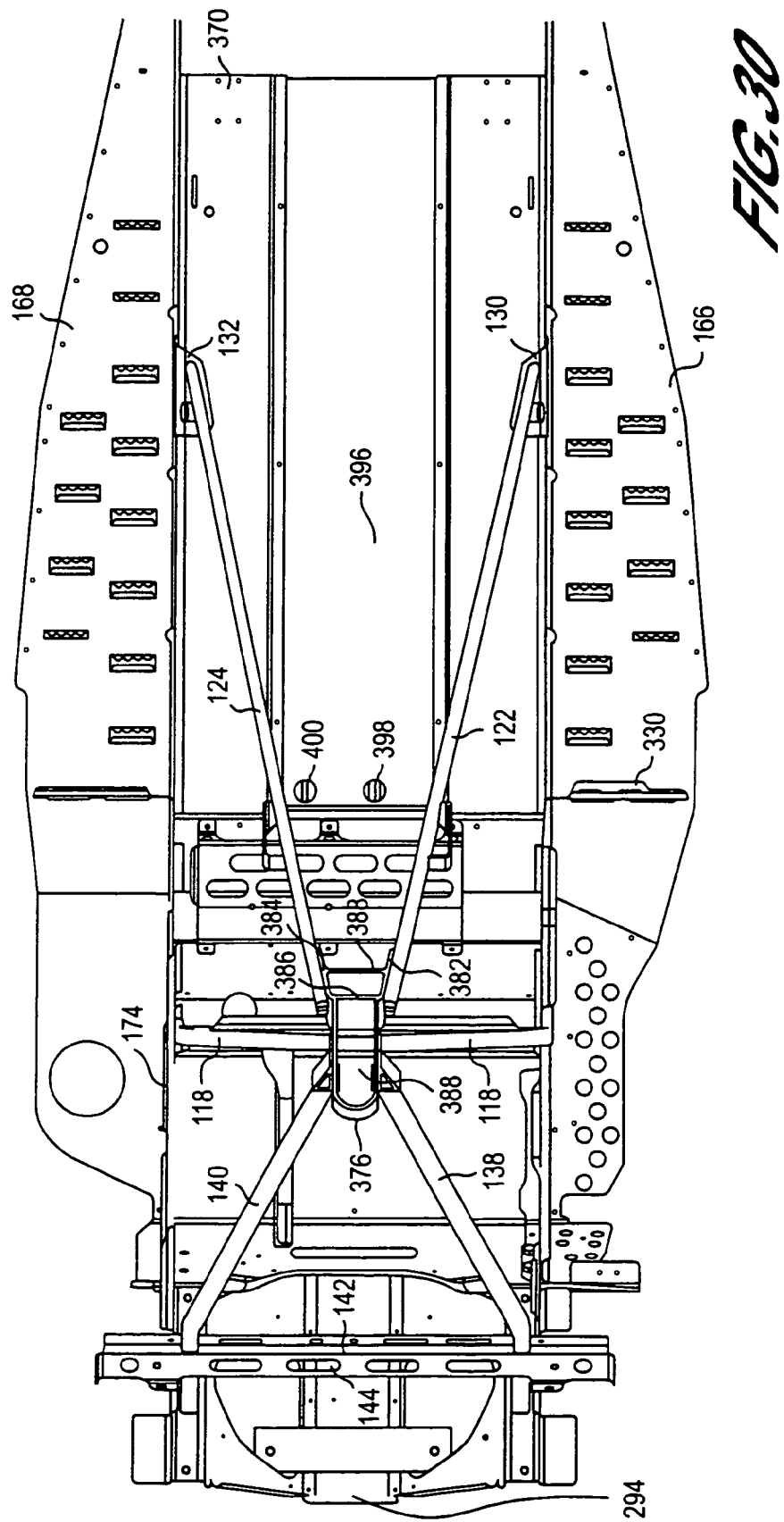
FIG. 30 is a top view of the frame assembly depicted in FIG. 28.

Variable geometry steering bracket 374 is essentially a U-shaped element with a rear end 376 and a forward end 378. At rear end 376, a first cross-member 380 extends between left and right legs 382, 384 of variable geometry steering bracket 374 to define a closed structure. A second cross member 386 extends between left and right legs 382, 384 forward of first cross member 380 and defines a U-shaped opening 387 toward forward end 378 of variable geometry steering bracket 374. A first pair of holes 388 and a second pair of holes 390 are disposed through left and right legs 382, 382 of variable geometry steering bracket 374 and provide separate attachment points for steering shaft 364. FIG. 29 illustrates the same structures in side view and FIG. 30 illustrates the same structures in top view.

Figure 31:
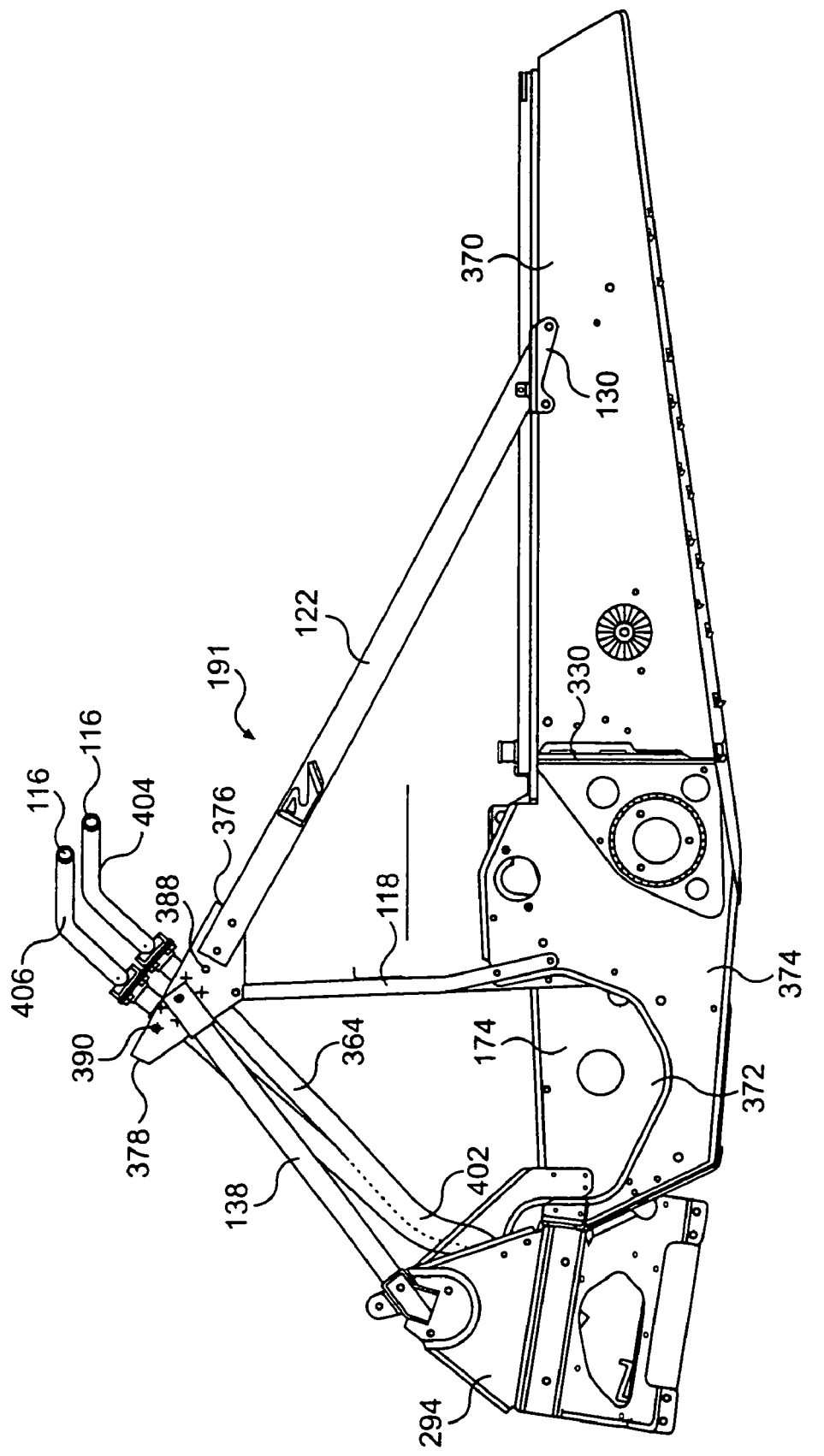
FIG. 31 is a side view illustration of the frame assembly shown in FIG. 29, illustrating the variable positioning of the handlebars that is possible with this embodiment of the present invention.

FIG. 31 provides another side view of the frame assembly of the present invention and illustrates the two positions of steering shaft 364 made possible by the construction of variable geometry steering bracket 374. To accommodate the variable geometry of steering shaft 362 and handlebars 116, steering shaft 364 includes a bend 402 at its lower end. Steering shaft 364 passes through a bearing or bushing (not shown) at its upper end that is connected to variable geometry steering bracket 374 at either of first or second pairs of holes 388, 390. By selecting either first or second pairs of holes 388, 390, first and second handlebar positions 404, 406 are selectable. As would be recognized by those skilled in the art, however, variable geometry steering bracket 374 may be provided with greater that two pairs of holes 388, 390 to further increase the variability handlebars 116. Also, variable geometry steering bracket 374 may be provided with a construction that permits infinite variation of the position of handlebars, as would be understood by those skilled in the art, should such a construction be desired.

Figure 32:
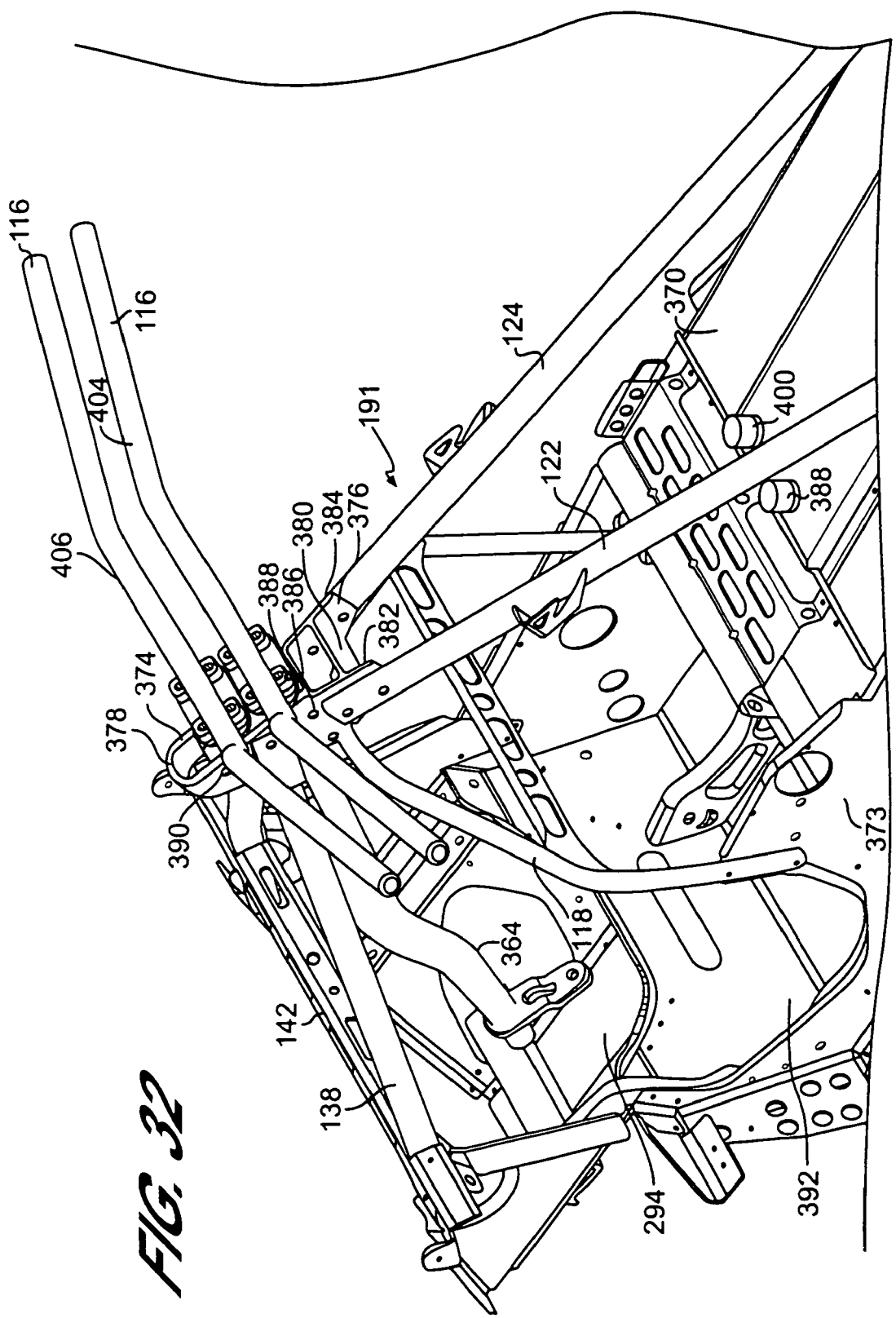
FIG. 32 is a perspective illustration of the embodiment shown in FIG. 31, showing in greater detail the variations in positioning of the handlebars that is made possible by the construction of the present invention.
Figure 33:
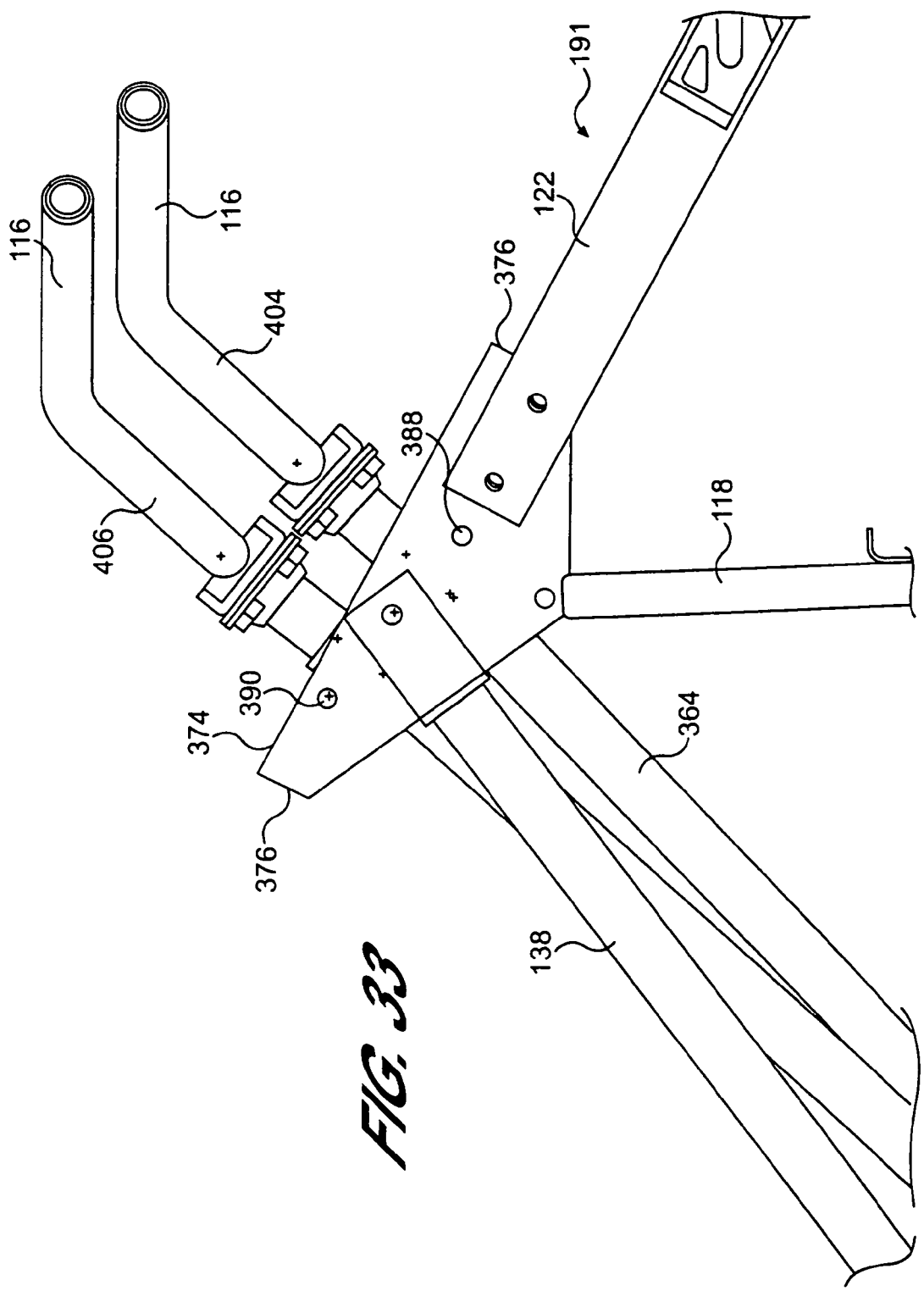
FIG. 33 is a close-up side-view detail of the connection point between the handlebars and the frame assembly of the present invention, illustrating the variable positioning of the handlebars.
Figure 34:
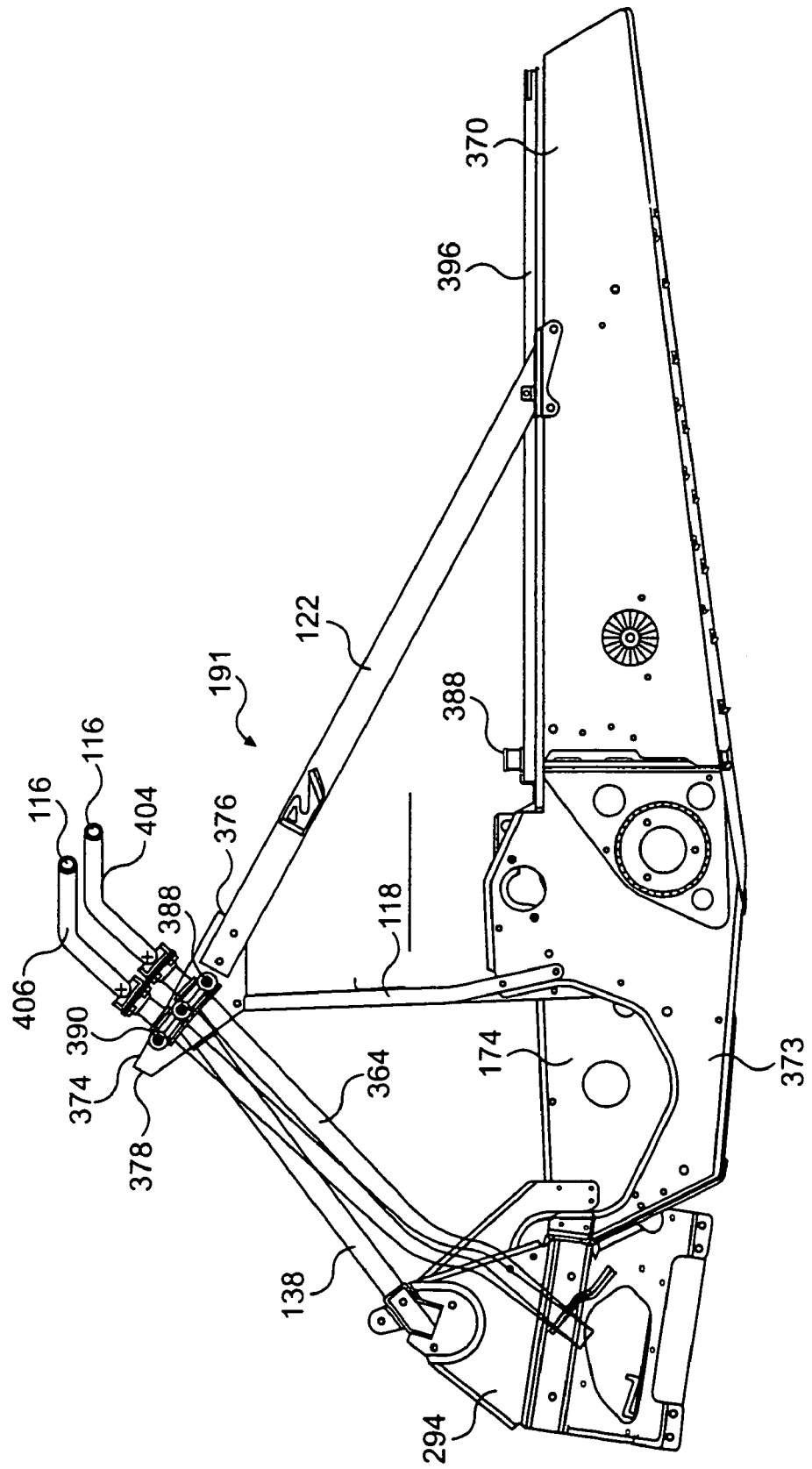
FIG. 34 is a further illustration of the variable positioning feature of the present invention.

FIGS. 32-34 provide additional views of the variable positioning of the handlebars 116 to facilitate an understanding of the scope of the present invention.

Frame assembly 84, 190, 191 of the present invention uniquely distributes the weight loaded onto the vehicle, whether it is snowmobile 22 or one of wheeled vehicles 332, 356. Each of the main components of the frame assembly 84, 190, 191 forms a triangular or pyramidal configuration. All of the bars of the frame assembly 84, 190, 191 work only in tension and compression, without bending. Therefore, each bar of frame assembly 84, 190, 191 intersects at a common point, the bracket 126 (in the non-variable steering geometry) or variable geometry steering bracket 374. With this pyramidal shape, the present invention creates a very stable geometry.

Specifically, the structure of frame assembly 84, 190, 191 enhances the torsional and structural rigidity of the frame of the vehicle. This improves handling. Usually, with a snowmobile, there is only a small torsional moment because the width of the snowmobile is only about 15 inches. An ATV, on the other hand, has a width of about 50 inches and, as a result, experiences a significant torsional moment. Therefore, to construct a frame assembly that is useable in either a snowmobile or an ATV, the frame must be able to withstand the torsional forces associated with an ATV.

Not only does frame assembly 84, 190, 191 reduce torsional bending, it also reduces the bending moment from front to rear. The increased rigidity in both directions further improves handling.

In addition, the creation of frame assembly 84, 190, 191 has at least one further advantage in that the frame can be made lighter and stronger than prior art frame assemblies (such as frame assembly 52, which is illustrated in FIG. 4). In the conventional snowmobile, frame assembly 52 included a tunnel 54 and an engine cradle 56 that were riveted together. Because frame assembly 84, 190, 191 adds strength and rigidity to the overall construction and absorbs and redistributes many of the forces encountered by the frame of the vehicle, the panels that make up the tunnel 86 and the engine cradle 88 need not be as strong or as thick as was required for the construction of frame assembly 52.

In the front of the vehicle, left and right shock absorbers 326, 328 are connected to forward support assembly 134 so that the forces experienced by left and right shock absorbers 326, 328 are transmitted to frame assembly 84, 190, 191. In the rear of the vehicle, the left and right braces 122, 124 are orientated with respect to the rear suspension. Upper column 118 is positioned close to the center of gravity of the vehicle's sprung weight. The sprung weight equals all of the weight loaded onto the vehicle's entire suspension. The positioning of these elements such that they transmit forces encountered at the front, middle and rear of the vehicle to an apex creates a very stable vehicle that is capable of withstanding virtually any forces that the vehicle may encounter during operation without sacrificing vehicle performance.

Figure 35:
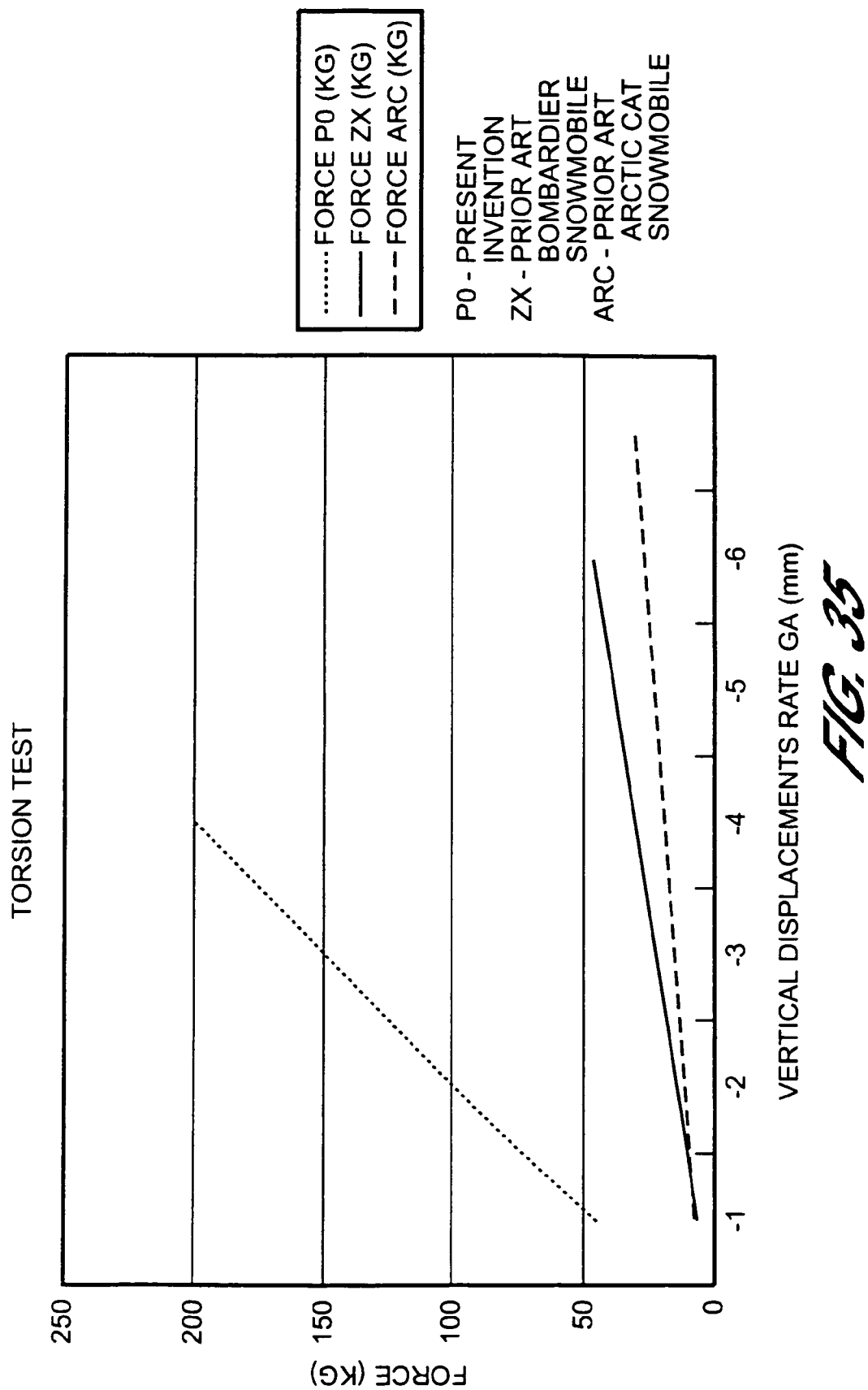
FIG. 35 is a graph showing the vertical displacement rate of the frame of the present invention in comparison with a prior art Bombardier snowmobile (the ZX™ series) and a prior art snowmobile made by Arctic Cat.

FIG. 35 illustrates the degree to which the rigidity of a frame constructed according to the teachings of the present invention is improved. The test illustrated here is known as a three-point test because three points on the frame are held in a fixed position and a fourth point is subjected to a measurable force. The displacement of the frame under a particular load is measured. The smaller the distance that the frame moves under a given stress, the greater is the rigidity of that frame.

Here, the highest line on the graph illustrates that for a 100 kg load, the vertical displacement of the frame of the present invention is only −2 mm. However, in the prior art Bombardier ZX™ model snowmobile, a load of only 50 kg produced a vertical displacement of −6 mm. In addition, a load of about 30 kg on the frame for the prior art Arctic Cat® snowmobile produced a vertical displacement of −6 mm. In other words, the structural rigidity of the frame assembly of the present invention is greatly improved.

Other aspects of the present invention will now be described in connection with FIGS. 27-38.

In each of the embodiments illustrated throughout the Figs., left leg 148 of upper column 118 attaches to the interior surface of right engine cradle wall 174. Right leg 150 of upper column 118 attaches to the exterior surface of left engine cradle wall 393. In this arrangement, upper column 118 may be detached from engine cradle 394 and removed easily by sliding upper column 118 from engine cradle 394 through C-shaped opening 392.

This embodiment of the frame assembly of the present invention differs from the previous embodiments in a few respects. First, left engine cradle wall 393 includes a C-shaped opening 392 instead of opening 182. C-shaped opening 392 facilitates maintenance of an engine (not shown) in engine cradle 394, because it facilitates access to the engine from the left side, which is the side to which the engine sits within engine cradle 394. Second, an elongated radiator 396 is integrated into tunnel 370. Radiator 396 includes an inlet 398 and an outlet 400 that are connected to the cooling system of the engine to assist in reducing the temperature of the coolant therein. To facilitate dissipation of heat, radiator 396 includes fins 402 on its underside.

Tunnel 370 and engine cradle 394 are constructed so that they form an integral unit, once assembled. The combined tunnel 370 and engine cradle 394 are essentially made up of three parts, a left side structure 408, a right side structure 410, and radiator 396. Left side structure 408 is the combination of left engine cradle wall 393 and left side plate 162. Right side structure is the combination of right engine cradle wall 174 and right side plate 164. In addition, front wall 206 and engine cradle bottom 207 also form a part of the combined structure made by tunnel 370 and engine cradle 394.

Left side structure 408 and right side structure 410 are stamped from a single sheet of metal. The rear portion of left side structure 408 is then bent at right angles to left side plate 162 to form a left top portion 412 of tunnel 370. Similarly, the rear portion of right side structure 410 is bent at right angles to right side plate 164 also to form a right top portion 414 of tunnel 370. Radiator 396 extends between left top portion 412 and right top portion 414 and connects left side structure 408 to right side structure 410.

Cradle wall 393 include bolt holes 395 where bolts (not shown) connect to an engine mount 323, shown in FIG. 19, in order to connect the engine 104 to the cradle wall 393. To facilitate assembly of the engine 104 with the vehicle, the engine mount 323, which is attached to the cradle wall 393 with bolts (not shown) which pass through the cradle wall 393, unlike through the bottom plate 66 in the prior art engine cradle shown in FIG. 4.

Figure 36:
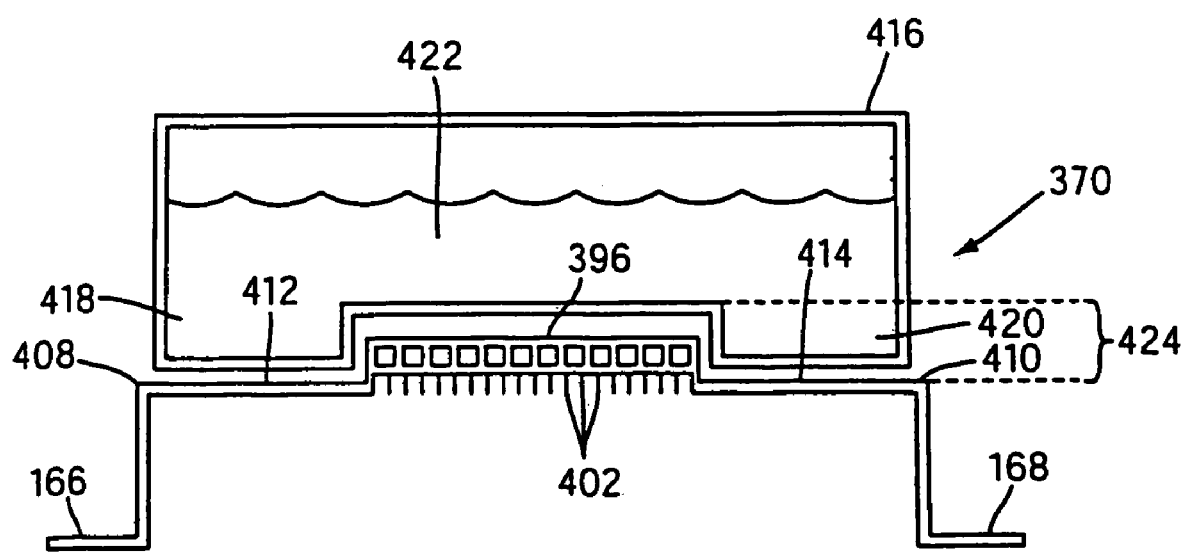
FIG. 36 is a cross-sectional illustration of the construction of the tunnel of the present invention, showing the positioning of a gas tank thereon.
Figure 36:
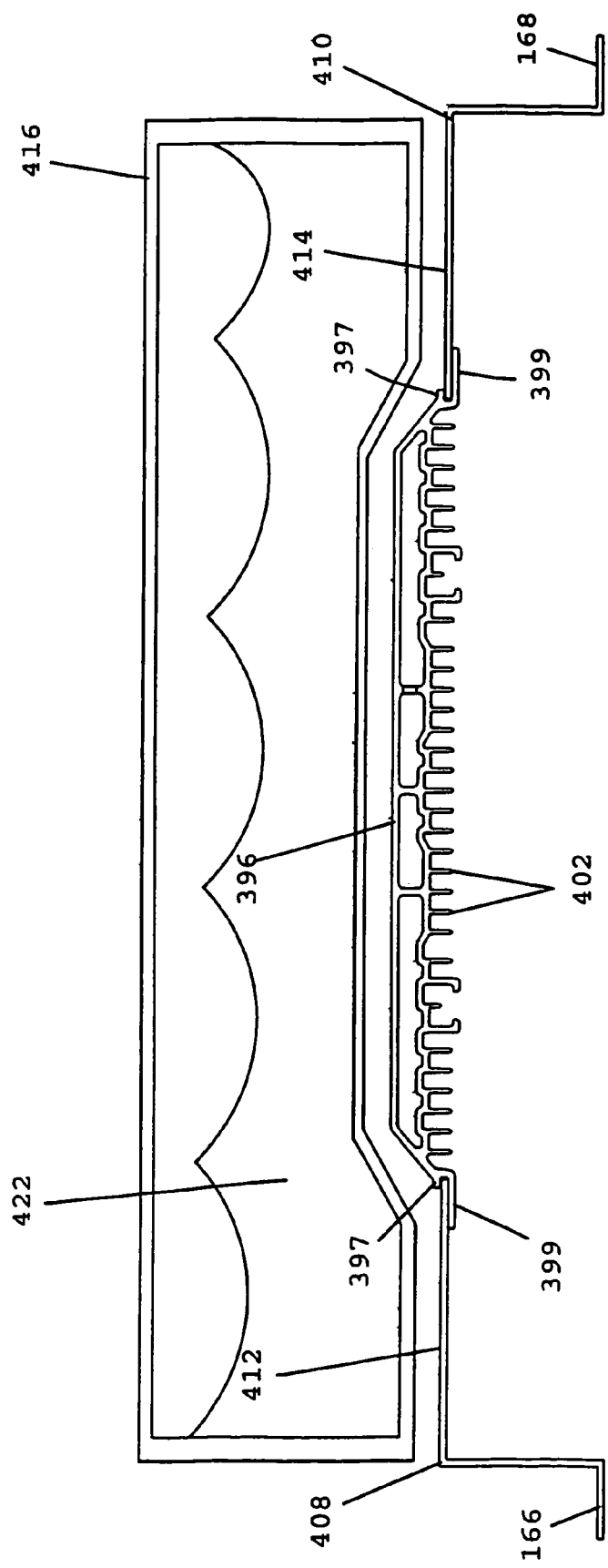
Figure 37:
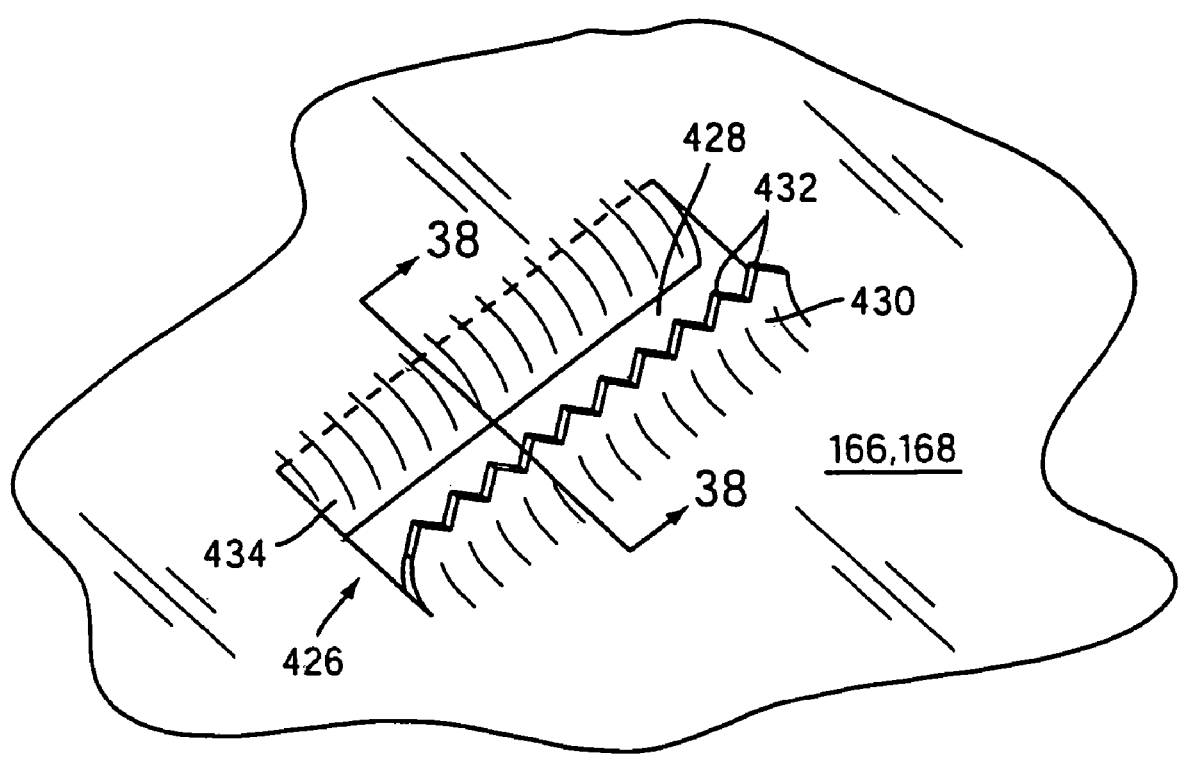
FIG. 37 is an enlarged, perspective illustration of a foot-gripping element constructed according to the teachings of the present invention.
Figure 38:
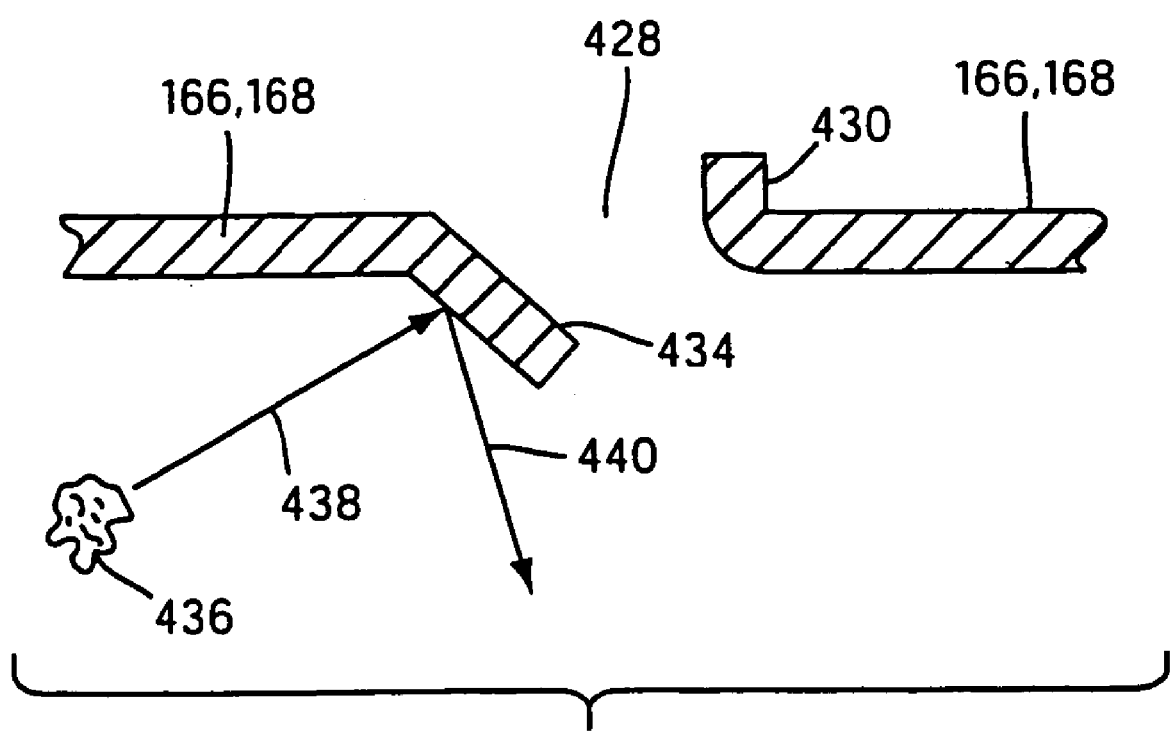
FIG. 38 is a cross-sectional illustration, taken along line 38-38 in FIG. 37, of the foot-gripping element constructed according to the teachings of the present invention.

The attachment between the radiator 396 and the left and right side structures 408 and 410 is shown in FIG. 36(*a*). The radiator 396 includes upper lips 397 and lower lips 399 that define C-shaped side portions of the radiator 396 that hold portions of the left and right side structures 408 and 410.

In addition, because radiator 396 connects left side structure 408 with right side structure 410 in the manner shown, additional space is created on tunnel 370 for a larger fuel tank 416 (shown in dotted lines in FIG. 18). As illustrated in FIG. 36, fuel tank 416 has an inverted U-shaped appearance so that it "drapes" over radiator 396. On its bottom, tank 416 includes two downwardly-extending sections 418, 420 that provide an increased fuel capacity to fuel tank 416. Depending upon the height of radiator 396, the amount of fuel 422 that may be contained in tank 416 may be significantly increased. In the embodiment shown, height 424 is approximately 17 mm.

Because the frame assembly 84 is designed to absorb and transfer energy for the frame, the thickness of left engine cradle wall 393 and right engine cradle wall 174 need not be as great as was required in the prior art construction (see, e.g., FIG. 4). Specifically, the construction of the engine cradle 56 in the prior art required a plate thickness of approximately 2.58 mm. With the frame assembly 84, however, the plate thickness for engine cradle 394 may be reduced to less than about 2.5 mm. More preferably, the thickness may be reduced to about 2.0 mm, which results in a significant weight savings.

In addition, engine cradle 56 included a forward wall 57 that was an extruded element so that forward wall 57 would be thick enough and strong enough to withstand the magnitude of forces exerted upon it. With the construction of engine cradle 394, however, front wall 206 does not need to be a thick, extruded element. Instead, front wall 206 may be a piece stamped from a metal sheet, just like left side structure 408 and right side structure 410. Similarly, engine cradle bottom 207 may also be stamped from a sheet of metal. As shown in FIGS. 30 and 32, the engine cradle also includes a rear panel or wall or apron 900 that may be stamped from a metal sheet. The rear panel 900 extends from a rear portion of the engine cradle bottom 207 and is bent to include a plurality of angled sections that extend from the engine cradle bottom 207 to the tunnel 370.

Left footrest 166 and right footrest 168 are both provided with a number of foot-gripping elements 426. One of foot-gripping elements 426 is illustrated in enlarged detail in FIGS. 37 and 38. Foot-gripping element 426 is constructed as part of a hole 428 through the foot rests 166, 168. On one side, a jagged element 430 with teeth 432 curves upwardly from footrest 166, 168. On the other side, a deflector element 434 curves downwardly.

Foot-gripping elements 426 provide traction for the feet of the riders because they extend upwardly from the top surface of foot rests 166, 168. The top of each jagged portion 430 includes teeth 432 that provide increased traction for the rider's feet. Deflector element 434 at the other side of hole 428 preferably deflects snow or dirt particles 436 that may be stirred up by the movement of the vehicle over the ground. If a particle 436 moves toward the bottom of foot rests 166, 168, in the direction shown by arrow 438, deflector element 343 will deflect particle 436 so that it travels in the direction shown by arrow 440, which is away from hole 428. As a result, particulate material 436 is discouraged from passing through hole 428 and accumulating on the top of foot rests 166, 168.

To construct foot-gripping elements, 426, it is preferred that jagged portions 430 and deflector portion 434 be stamped from footrest 166, 168 at the same time. Jagged portion 430 may be bent upwardly and deflector portion 434 may be bent downwardly so that the two portions of foot-gripping element are in the preferred orientation. It is preferred that deflector portion 434 be forward of hole 428 and that jagged portion 430 be rearward of hole 428. This minimizes the potential for particles 436 to pass through hole 428 and accumulate on the top surface of footrests 166, 168.

While the invention has been described by way of example embodiments, it is understood that the words which have been used herein are words of description, rather than words of limitation. Changes may be made, within the purview of the appended claims without departing from the scope and the spirit of the invention in its broader aspects.

Although the invention has been described herein with reference to particular structures, materials, and embodiments, it is understood that the invention is not limited to the particulars disclosed.

What is claimed is:

1. A snowmobile, comprising:
    a frame including a tunnel;
    a handlebar disposed on said frame;
    at least two skis mounted at a forward portion of said frame, the at least two skis being operatively connected to said handlebar to provide steering control of said snowmobile;
    an engine supported by said frame; and
    an endless track positioned below the tunnel indirectly connected to the engine, wherein the tunnel includes:
        a left portion including a substantially horizontal top, a substantially vertical side extending downwardly from the top, and a substantially horizontal left footrest extending outwardly from the side;
        a right portion including a substantially horizontal top, a substantially vertical side extending downwardly from the top, and a substantially horizontal right footrest extending outwardly from the side; and
        a radiator disposed between the top of the left portion and the top of the right portion, the radiator connecting the left portion to the right portion along a majority of a length of the tunnel over the endless track.

2. The snowmobile of claim 1, further comprising:
    an engine cradle attached to a front of the tunnel.

3. The snowmobile of claim 2, further comprising:
    a sub-frame assembly connected to the front of the engine cradle to form part of a front suspension assembly of the snowmobile.

4. The snowmobile of claim 3, wherein the sub-frame assembly is an elongated V-shaped structure.

* * * * *

UNITED STATES PATENT AND TRADEMARK OFFICE
CERTIFICATE OF CORRECTION

| | | |
|---|---|---|
| PATENT NO. | : 7,451,846 B2 | Page 1 of 1 |
| APPLICATION NO. | : 11/330064 | |
| DATED | : November 18, 2008 | |
| INVENTOR(S) | : Jerome Wubbolts and Anne-Marie Dion | |

It is certified that error appears in the above-identified patent and that said Letters Patent is hereby corrected as shown below:

On the Title page

Under Section (30) the priority date of the foreign application should read
-- Dec. 23, 1998 (CA) 2256944 --

Signed and Sealed this

Sixth Day of January, 2009

JON W. DUDAS
*Director of the United States Patent and Trademark Office*